(12) United States Patent
Rao et al.

(10) Patent No.: US 11,728,112 B2
(45) Date of Patent: Aug. 15, 2023

(54) DOUBLE-POLE CIRCUIT BREAKER AND DISTRIBUTION BOX

(71) Applicant: Xiamen Hongfa Electrical Safety & Controls Co., Ltd., Xiamen (CN)

(72) Inventors: Yingfeng Rao, Xiamen (CN); Wenxing Huang, Xiamen (CN); Qingyan Lu, Xiamen (CN); Junyi Jiang, Xiamen (CN); Jianghai Zhuo, Xiamen (CN); Jinquan Zhang, Xianmen (CN)

(73) Assignee: Xiamen Hongfa Electrical Safety & Controls Co., Ltd., Xiamen (CN)

( * ) Notice: Subject to any disclaimer, the term of this patent is extended or adjusted under 35 U.S.C. 154(b) by 0 days.

(21) Appl. No.: 17/537,359

(22) Filed: Nov. 29, 2021

(65) Prior Publication Data

US 2022/0172913 A1    Jun. 2, 2022

(30) Foreign Application Priority Data

Nov. 30, 2020   (CN) .......................... 202011372872.2
Dec. 11, 2020   (CN) .......................... 202011444748.2

(51) Int. Cl.
*H01H 33/04* (2006.01)
*H01H 33/53* (2006.01)
*H02G 3/08* (2006.01)

(52) U.S. Cl.
CPC ............ *H01H 33/53* (2013.01); *H01H 33/04* (2013.01); *H02G 3/08* (2013.01)

(58) Field of Classification Search
CPC ........ H01H 33/53; H01H 33/04; H01H 33/62; H01H 9/30; H01H 71/0207; H01H 71/08; H01H 71/082; H01H 71/1027; H01H 71/1045; H02B 1/26; H02G 3/08
USPC ...... 218/146, 69, 71, 82, 115; 200/9, 13, 14, 200/18, 42.01, 51.04
See application file for complete search history.

(56) References Cited

U.S. PATENT DOCUMENTS

| 4,207,449 | A  | * | 6/1980 | Robins ................. | H01H 9/0264 |
| | | | | | 200/308 |
| 6,437,268 | B1 | * | 8/2002 | Etscheidt ................ | H01R 4/36 |
| | | | | | 200/305 |
| 6,563,406 | B2 | * | 5/2003 | Beatty ................ | H01H 71/1045 |
| | | | | | 335/8 |
| 7,005,590 | B1 | * | 2/2006 | Willis ...................... | H01H 9/26 |
| | | | | | 200/43.14 |

(Continued)

*Primary Examiner* — William A Bolton
(74) *Attorney, Agent, or Firm* — Wolf, Greenfield & Sacks, P.C.

(57) ABSTRACT

A double-pole circuit breaker and a distribution box are provided. The circuit breaker includes a case, a first-pole and a second-pole conductive assembly which are disposed in the case, the first-pole conductive assembly is provided with a first inlet and a first outlet wire terminals and a first contact mechanism, the second-pole conductive assembly is provided with a second inlet and a second outlet wire terminals and a second contact mechanism; the first and the second-pole conductive assembly are crossed each other, and the first and second outlet wire terminals respectively include a first and second outlet terminal seat which are arranged side by side and spaced in a lateral direction, and are exposed the case, and are extended in a longitudinal direction, the first and second contact mechanisms are laterally arranged in the case, and are disposed in a span between the first and second outlet wire terminals.

20 Claims, 17 Drawing Sheets

(56) References Cited

U.S. PATENT DOCUMENTS

| | | | |
|---|---|---|---|
| 7,170,020 B2* | 1/2007 | Kawata | H01H 9/0264 |
| | | | 200/333 |
| 8,859,918 B2* | 10/2014 | Sisley | H01H 71/0207 |
| | | | 200/293 |
| 10,483,065 B2* | 11/2019 | Oh | H01H 71/164 |
| 2014/0175062 A1* | 6/2014 | Gerving | H01H 9/342 |
| | | | 218/157 |

* cited by examiner

B-B

DOUBLE-POLE CIRCUIT BREAKER AND DISTRIBUTION BOX

CROSS REFERENCE

This application claims priority to Chinese Patent Application No. 202011372872.2, titled "Double-pole circuit breaker and distribution box having the same", filed on Nov. 30, 2020, and to Chinese Patent Application No. 202011444748.2, titled "Wiring terminal and electromechanical component having the same", filed on Dec. 11, 2020, the entire contents thereof are incorporated herein by reference.

TECHNICAL FIELD

The present disclosure relates to the field of circuit breakers, and in particular, to a double-pole circuit breaker and a distribution box having the same.

BACKGROUND

In the related art, the circuit breaker used in the inlet end of the distribution box is usually a double-pole circuit breaker, one pole is connected to A-phase power line, and the other pole is connected to B-phase power line. This kind of circuit breaker generally adopts the wiring method of "upper incoming wire-lower outgoing wire" or "lower incoming wire-upper outgoing wire", and the contact system is arranged vertically between the inlet wire terminal and the outlet wire terminal, resulting in a large volume of the circuit breaker, and because the internal space of the distribution box is small, it often causes the problem that the circuit breaker cannot be installed.

SUMMARY

According to one aspect of the present disclosure, a double-pole circuit breaker is provided and includes: a case, a first-pole conductive assembly and a second-pole conductive assembly, the first-pole conductive assembly is disposed and extended in the case and is provided with a first inlet wire terminal and a first outlet wire terminal, the second-pole conductive assembly is disposed and extended in the case and is provided with a second inlet wire terminal and a second outlet wire terminal, the first-pole conductive assembly is provided a first contact mechanism, the second-pole conductive assembly is provided with a second contact mechanism; the first-pole conductive assembly and the second-pole conductive assembly are crossed each other, and the first outlet wire terminal includes a first outlet terminal seat, the second outlet wire terminal includes a second outlet terminal seat, the first outlet terminal seat and the second outlet terminal seat are arranged side by side and spaced in a lateral direction, and are exposed a first side of the case, the first outlet terminal seat and the second outlet terminal seat are extended in a longitudinal direction, the first contact mechanism and the second contact mechanism are laterally arranged in the case in parallel, and are disposed in a span between the first outlet wire terminal and the second outlet wire terminal.

According to an exemplary embodiment of the present disclosure, the first contact mechanism and the second contact mechanism respectively have a first moving trace and a second moving trace, an extension direction of the first outlet terminal seat and an extension direction of the second outlet terminal seat are both perpendicular to movement planes where the first moving trace and the second moving trace are located.

According to an exemplary embodiment of the present disclosure, the first inlet wire terminal includes a first inlet terminal seat, the second inlet wire terminal includes a second inlet terminal seat, the first inlet terminal seat and the second inlet terminal seat are arranged side by side and spaced in the lateral direction, and are exposed a second side of the case, the second side is opposite to the first side.

According to an exemplary embodiment of the present disclosure, a connecting line from the first inlet terminal seat to the second outlet terminal seat is parallel to a connecting line from the second inlet terminal seat to the first outlet terminal seat.

According to an exemplary embodiment of the present disclosure, the first outlet terminal seat and the second outlet terminal seat are located at a lower side of the case in the longitudinal direction, and the first outlet terminal seat is located at a right side of the second outlet terminal seat in the lateral direction, the first-pole conductive assembly extending from the first inlet wire terminal to the first outlet wire terminal is an inverted Z-shape extending along "downward-rightward-downward", the second-pole conductive assembly extending from the second inlet wire terminal to the second outlet wire terminal is a Z-shape extending along "downward-leftward-downward".

According to an exemplary embodiment of the present disclosure, the first inlet wire terminal further includes a first copper bar, the first-pole conductive assembly further includes a first conductive sheet and a first connecting member, the first inlet terminal seat, the first copper bar, the first conductive sheet, the first connecting member, the first contact mechanism and the first outlet wire terminal are connected in sequence, the first inlet terminal seat, the first copper bar and the first outlet wire terminal are arranged in sequence in the longitudinal direction, the first contact mechanism and the first connecting member are arranged in the lateral direction; the first conductive sheet is a bent sheet body, which is configured to connect the first copper bar extending in the longitudinal direction and the first connecting member extending in the lateral direction through a bent structure of the first conductive sheet to make the first-pole conductive assembly extend from the first inlet wire terminal to the first outlet wire terminal along "downward-rightward-downward" to have the inverted Z-shape; the second inlet wire terminal further includes a second copper bar, the second-pole conductive assembly further includes a second conductive sheet and a second connecting member, the second inlet terminal seat, the second copper bar, the second contact mechanism, the second connecting member, the second conductive sheet, and the second outlet wire terminal are connected in sequence, the second inlet terminal seat, the second copper bar and the second outlet wire terminal are arranged in sequence in the longitudinal direction, the second contact mechanism and the second connecting member are arranged in the lateral direction; the second conductive sheet is a bent sheet body, which is configured to connect the second connecting member extending in the lateral direction and the second outlet wire terminal extending in the longitudinal direction through a bent structure of the second conductive sheet to make the second-pole conductive assembly extend from the second inlet wire terminal to the second outlet wire terminal along "downward-leftward-downward" to have the Z-shape.

According to an exemplary embodiment of the present disclosure, the double-pole circuit breaker further includes a first over-current release installed on the first conductive sheet; and a second over-current release installed on the second conductive sheet.

According to an exemplary embodiment of the present disclosure, the double-pole circuit breaker further includes a first arc extinguishing chamber configured to accommodate the first moving trace; and a second arc extinguishing chamber configured to accommodate the second moving trace.

According to an exemplary embodiment of the present disclosure, the first outlet terminal seat is located at a right side of the second outlet terminal seat in the lateral direction, and the first inlet wire terminal and the second inlet wire terminal are respectively arranged at a left side and a right side of the case in the lateral direction.

According to an exemplary embodiment of the present disclosure, the first outlet terminal seat and the second outlet terminal seat are located at a lower side of the case in the longitudinal direction, the first-pole conductive assembly extending from the first inlet wire terminal to the first outlet wire terminal is an inverted L-shape extending along "rightward-downward", the second-pole conductive assembly extending from the second inlet wire terminal to the second outlet wire terminal is an L-shape extending along "leftward-downward".

According to an exemplary embodiment of the present disclosure, the first inlet wire terminal includes a first inlet terminal seat, the second inlet wire terminal includes a second inlet terminal seat, the first inlet terminal seat and the second inlet terminal seat are spaced apart in the longitudinal direction and arranged up and down.

According to an exemplary embodiment of the present disclosure, the first-pole conductive assembly includes a first inlet wire terminal, a first contact mechanism, a first connecting member, a first conductive sheet and a first outlet wire terminal that are connected in sequence, the first inlet wire terminal, the first contact mechanism and the first connecting member are arranged in the lateral direction, the first outlet wire terminal arranged in the longitudinal direction, the first conductive sheet is a bent sheet body, which is configured to connect the first connecting member extending in the lateral direction and the first outlet wire terminal extending in the longitudinal direction through a bent structure of the first conductive sheet to make the first-pole conductive assembly extend from the first inlet wire terminal to the first outlet wire terminal along "rightward-downward" to have the inverted L-shape; the second-pole conductive assembly includes a second inlet wire terminal, a second conductive sheet, a second connecting member, a second contact mechanism, and a second outlet wire terminal that are connected in sequence, the second inlet wire terminal, the second conductive sheet, the second connecting member and the second contact mechanism are arranged in the lateral direction, the second outlet wire terminal arranged in the longitudinal direction, so as to make the second-pole conductive assembly extend from the second inlet wire terminal to the second outlet wire terminal along "leftward-downward" to have the L-shape.

According to an exemplary embodiment of the present disclosure, the double-pole circuit breaker further includes an operating mechanism installed laterally on the first contact mechanism or the second contact mechanism and configured to control the closing and opening of the first contact mechanism or the second contact mechanism, so that the first contact mechanism and the second contact mechanism are moved synchronously.

According to an exemplary embodiment of the present disclosure, the double-pole circuit breaker further includes a nut frame, a screw, a copper bar and a bracket, wherein the screw is screwed on the nut frame and is enable to be rotated to inserted into the nut frame, one end of the nut frame to which the screw is screwed is an upper end, and another end away from the upper end is a lower end; the lower end of the nut frame is supported on the bracket, the nut frame is provided with a socket, the copper bar is provided with a protruding post matching the shape of the socket, the copper bar is inserted into the nut frame, the lower end of the nut frame is located between the bracket and the copper bar, and the protruding post is inserted into the socket, so that the nut frame is limited.

According to an exemplary embodiment of the present disclosure, the nut frame is limited in a way of having shaking allowance; a value of a fit gap between the protruding post and the socket is in a range of 0.3 mm to 1 mm.

According to an exemplary embodiment of the present disclosure, a thickness of the lower end of the nut frame is equal to a distance between the bracket and the copper bar.

According to an exemplary embodiment of the present disclosure, the copper bar is defined with a slot at a position facing the screw column directly; the slot is a through hole, and a center of the slot is coincided with a center of the protruding post.

According to an exemplary embodiment of the present disclosure, an annular groove is formed on an end surface of the screw facing the copper bar; one end portion of the screw facing the copper bar is in a tapered shape that is gradually contracted.

According to an exemplary embodiment of the present disclosure, the bracket is in a stepped structure, and includes a first step surface and a second step surface with a level difference, the copper bar is supported on the first step surface, and the bottom of the nut frame is supported on the second step surface.

According to another aspect of the present disclosure, a distribution box is provided, an inlet end of the distribution box is equipped with the double-pole circuit breaker in any of the above embodiments.

DETAILED DESCRIPTION

Figure 1:
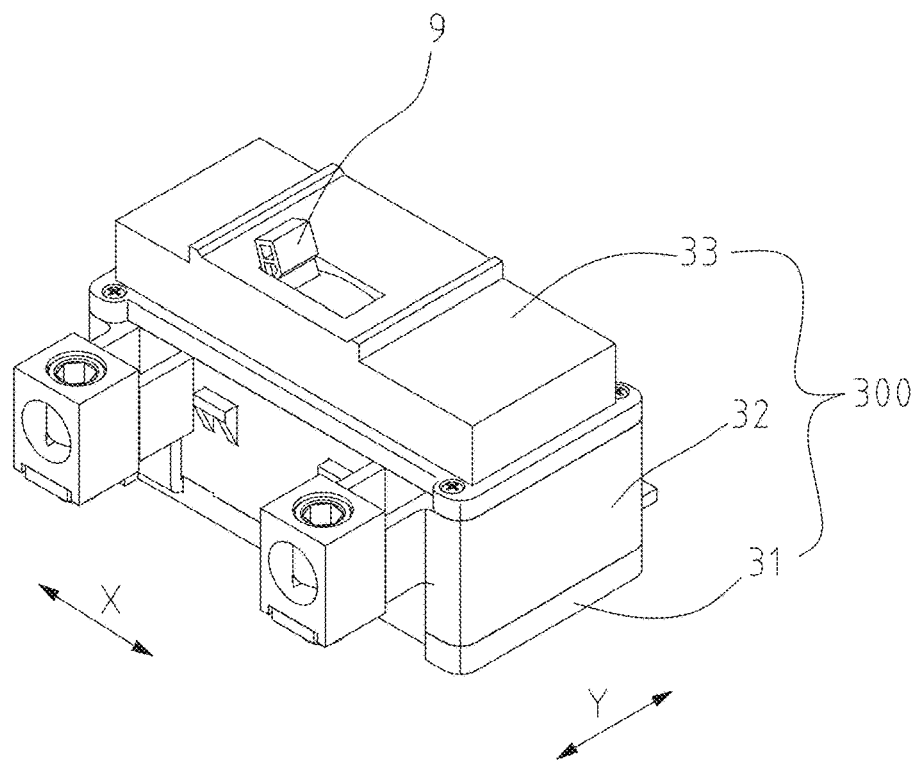
FIG. 1 is a perspective schematic view of a double-pole circuit breaker in an exemplary embodiment of the present disclosure.

To further illustrate the embodiments, the present disclosure is provided with drawings which are a part of the content disclosed by the present disclosure and are mainly used to illustrate the embodiments, and can cooperate with the relevant description in the specification to explain the operating principles of the embodiments. With reference to these contents, those of ordinary skill in the art should be able to understand other possible implementation manners and advantages of the present disclosure. The components in the drawings are not drawn to scale, and similar reference numerals are generally used to indicate similar components.

Figure 2:
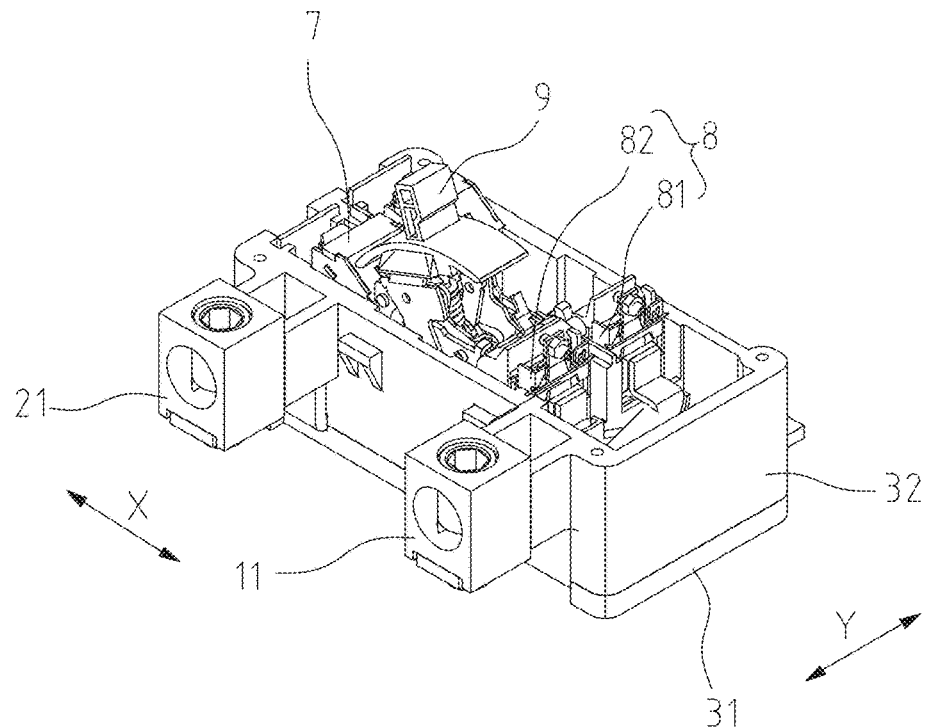
FIG. 2 is a perspective schematic view of a double-pole circuit breaker without a cover in an exemplary embodiment of the present disclosure.

The embodiment of the present disclosure provides a double-pole circuit breaker, which is applied to the inlet end of a distribution box, the two poles of the double-pole circuit breaker are connected to an A-phase power and a B-phase power respectively, as shown in FIGS. 1-4, the double-pole circuit breaker includes a first-pole conductive assembly 100, a second-pole conductive assembly 200, and a case 300, the first-pole conductive assembly 100 and the second-pole conductive assembly 200 are disposed in the case 300. The case 300 includes a base 31, a side wall 32, and a cover 33 that can be assembled as a whole. As shown in FIG. 1 and FIG. 2, the circuit breaker of the embodiment of the present disclosure further includes an operating mechanism 9 having a handle that exposes the case 300 to perform manual switching off and on. Please refer to FIGS. 4-6, the first-pole conductive assembly 100 (connected to an A-phase power) of the embodiment of the present disclosure includes a first inlet wire terminal 101 (the first inlet wire terminal 101 includes a first inlet terminal seat 11 and a first copper bar 12 that are fixedly and electrically connected together), a first conductive sheet 13, a first connecting member 14, a first contact mechanism 15 and a first outlet wire terminal 16 that are connected in sequence. The second-pole conductive assembly 200 (connected to B-phase power) includes a second inlet wire terminal 201 (the second inlet wire terminal 201 includes a second inlet terminal seat 21 and a second copper bar 22 that are fixedly and electrically connected together), a second contact mechanism 23, a second connecting member 24, a second conductive sheet 25, and a second outlet wire terminal 26 that are connected in sequence. Where, as shown in FIG. 5, the first outlet wire terminal 16 includes a first outlet terminal seat 162 which is in a shape of sheet, and a first connecting portion 161 for electrically connecting with the first contact mechanism 15. The first connecting portion 161 is fixedly connected to the first outlet terminal seat 162. The second outlet wire terminal 26 includes a second outlet terminal seat 262 which is in a shape of sheet, and a second connecting portion 261 for electrically connecting with the second conductive sheet 25, the second connecting portion 261 is fixedly connected to the second outlet terminal seat 262. As shown in FIG. 6, in the double-pole circuit breaker of the embodiment of the present disclosure, the first inlet terminal seat 11, the second inlet terminal seat 21, the first outlet terminal seat 162, and the second outlet terminal seat 262 all expose the case 300 to facilitate wiring. As shown in FIG. 5, the first contact mechanism 15 includes a first swing arm 153, a first movable contact 151 and a first stationary contact 152, the first movable contact 151 is provided on one end of the first swing arm 153, and the first stationary contact 152 is provided on the first connecting portion 161, the first stationary contact 152 is cooperated with the first movable contact 151 through being in contact therewith, the other end of the first swing arm 153 is rotatably connected with the first connecting member 14, when the first swing arm 153 swings upward, the first stationary contact 152 and the first movable contact 151 are separated, and when the first swing arm 153 swings downward, the first stationary contact 152 and the first movable contact 151 are in contact to be closed, so that the first-pole conductive assembly 100 is turned on. The second contact mechanism 23 includes a second swing arm 233, a second movable contact 231 and a second stationary contact 232, the second movable contact 231 is provided one end of the second swing arm 233, and the second stationary contact 232 is provided on the second copper bar 22, the second stationary contact 232 is cooperated with the second movable contact 231 through being in contact therewith, and the other end of the second swing arm 233 is rotatably connected with the second connecting member 24, when the second swing arm 233 swings upward, the second stationary contact 232 and the second movable contact 231 are separated, and when the second swing arm 233 swings downward, the second stationary contact 232 and the second movable contact 231 are in contact to be closed, so that the second-pole conductive assembly 200 is turned on. Both the first connecting member 14 and the second connecting member 24 can conduct electricity.

In some embodiments, as shown in FIGS. 1 and 6, the outer contour of the case 300 is substantially rectangular, the side wall 32 of the case 300 includes a first side surface 321 and a second side surface 322 oppositely arranged in the longitudinal direction Y, and a third side surface 323 and a fourth side surface 324 oppositely arranged in the lateral direction X. The longitudinal direction Y can be perpendicular to the lateral direction X. As shown in FIGS. 1 and 6, the first outlet terminal seat 162 and the second outlet terminal seat 262 are located at one side of the first side surface 321 in the longitudinal direction Y, as shown in FIG. 6, it can be understood that the first outlet terminal seat 162 and the second outlet terminal seat 262 are located at the lower side of the case 300 (side wall 32) in the longitudinal direction Y; the lower side of the case 300 is a first side 3211, and the upper side of the case 300 is a second side 3221.

The first inlet terminal seat 11 and the second inlet terminal seat 21 are spaced apart in the lateral direction X, and the first inlet terminal seat 11 and the second inlet terminal seat 21 are located at one side of the second side surface 322 in the longitudinal direction Y. As shown in FIG. 6, it can be understood that the first inlet terminal seat 11 and the second inlet terminal seat 21 are located at the upper side of the case 300 (side wall 32) in the longitudinal direction Y. The first outlet terminal seat 162 and the second outlet terminal seat 262 are spaced apart in the lateral direction X, and the first outlet terminal seat 162 corresponds to the second inlet terminal seat 21 in the longitudinal direction Y, and the second outlet terminal seat 262 corresponds to the first inlet terminal seat 11 in the longitudinal direction Y.

Figure 4:
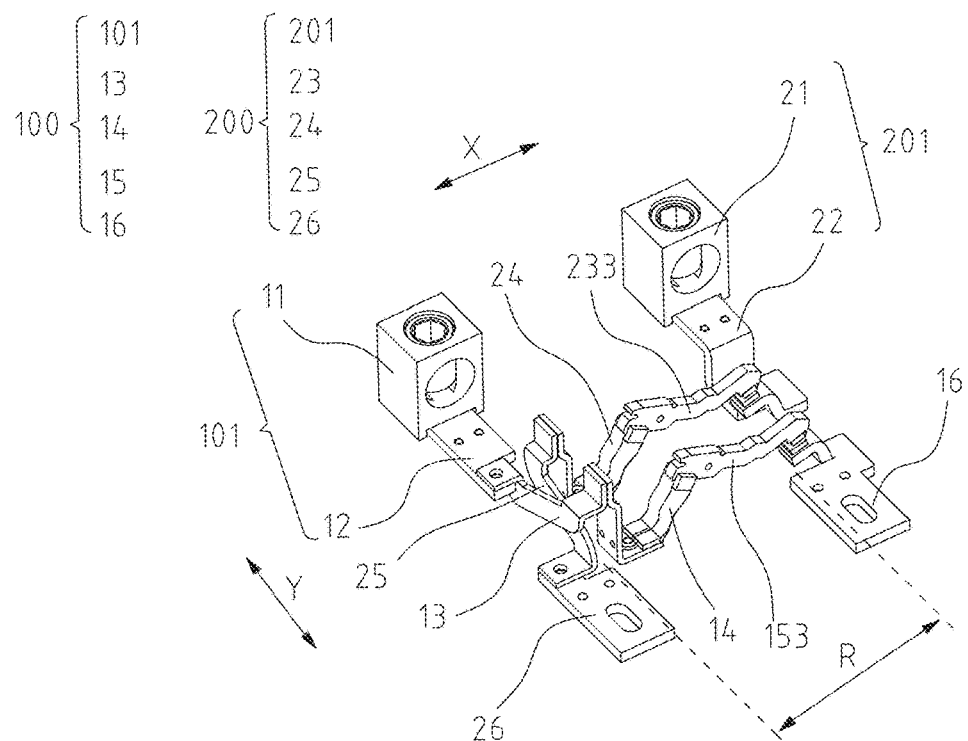
FIG. 4 is a schematic diagram of a first-pole conductive assembly and a second-pole conductive assembly in an exemplary embodiment of the present disclosure.
Figure 5:
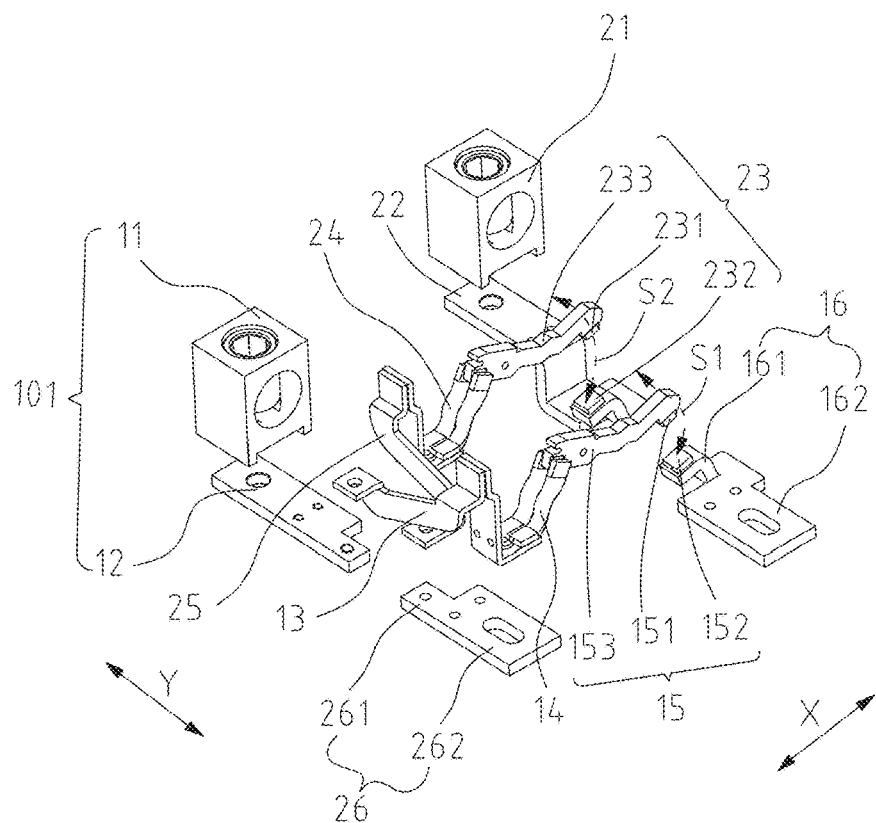
FIG. 5 is an exploded view of a first-pole conductive assembly and a second-pole conductive assembly in an exemplary embodiment of the present disclosure.
Figure 6:
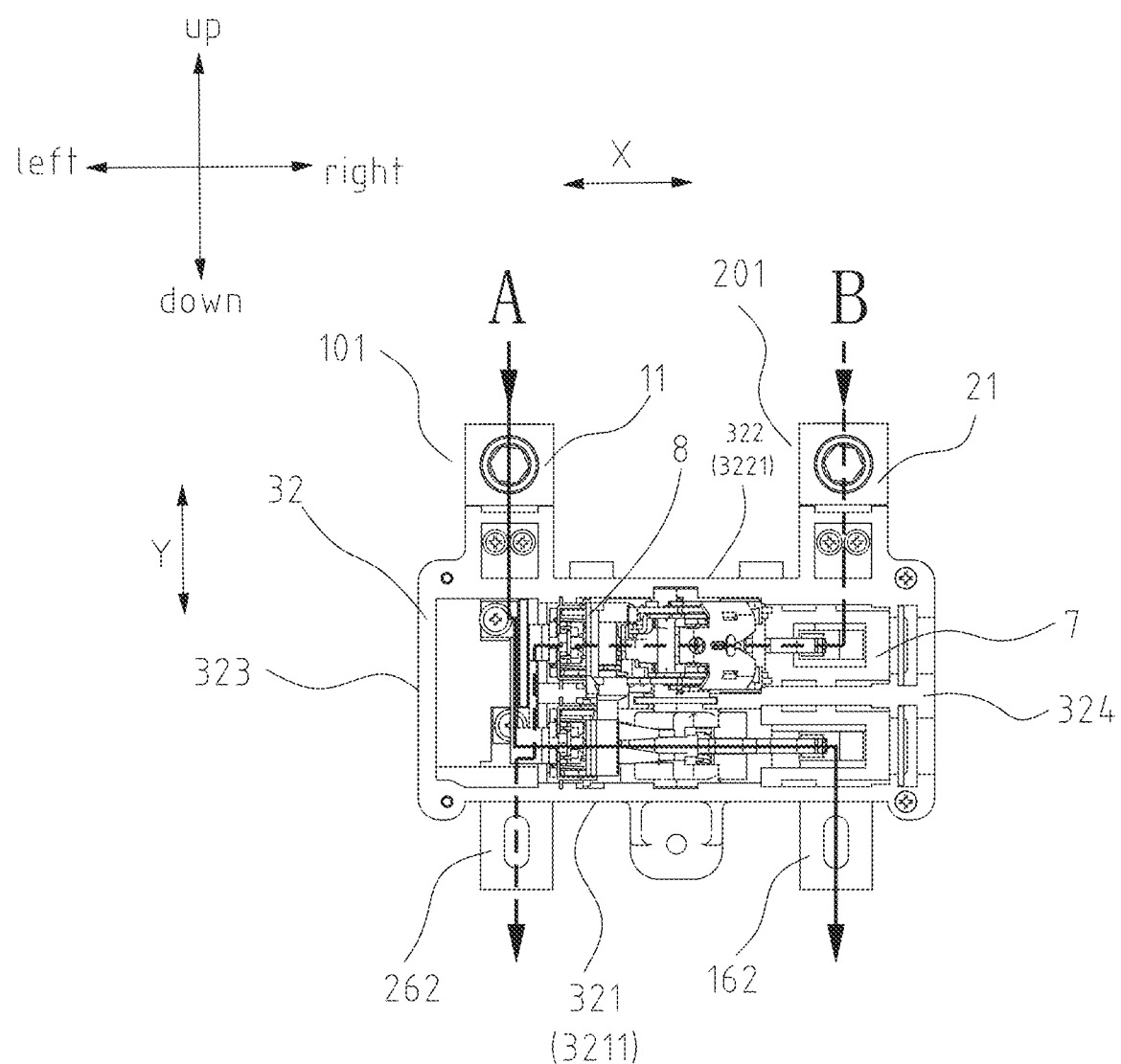
FIG. 6 is a schematic diagram showing the current flow of the double-pole circuit breaker in an exemplary embodiment of the present disclosure (including A-phase power and B-phase power).

As shown in FIGS. 4 and 5, in the first-pole conductive assembly 100, the first inlet terminal seat 11, the first copper bar 12, and the first conductive sheet 13 are sequentially connected along the longitudinal direction Y, one end of the first connecting member 14 away from the first contact mechanism 15 is connected to the first conductive sheet 13, and the first connecting member 14 extends along the lateral direction X, the first outlet wire terminal 16 extends along the longitudinal direction Y and is electrically connected to the first contact mechanism 15. Where, the first conductive sheet 13 is a bent sheet body, which connects the first copper bar 12 extending in the longitudinal direction Y and the first connecting member 14 extending in the lateral direction X through its bent structure, so that the wiring of the first-pole conductive assembly 100 from the first inlet wire terminal 101 to the first outlet wire terminal 16 is an inverted Z-shape extending along "downward-rightward-downward" as shown in FIG. 6, the inverted Z-shape is a bent shape formed by three segments. As shown in FIGS. 4 and 5, in the second-pole conductive assembly 200, the second inlet terminal seat 21, the second copper bar 22, and the second outlet wire terminal 26 are arranged up and down in the longitudinal direction Y, the second contact mechanism 23 and the second connecting member 24 are arranged left and right in the lateral direction X, as shown in FIG. 4, the second inlet terminal seat 21, the second copper bar 22, and the second outlet wire terminal 26 are sequentially connected along the longitudinal direction Y, where, the second conductive sheet 25 and the second outlet wire terminal 26 are sequentially connected along the longitudinal direction Y, the second connecting member 24 and the second swing arm 233 extend along the lateral direction X, so that the second movable contact 231 provided at one end of the second swing arm 233 is cooperated with the second stationary contact 232 provided on the second copper bar 22 through being in contact therewith, and one end of the second connecting member 24 away from the second swing arm 233 is connected to the second conductive sheet 25. The second conductive sheet 25 is a bent sheet body, which connects the second connecting member 24, the second contact mechanism 23 extending in the lateral direction X and the second outlet wire terminal 26 extending in the longitudinal direction Y through its bending structure, so that the wiring of the second-pole conductive assembly 200 from the second inlet wire terminal 201 to the second outlet wire terminal 26 is a Z-shape extending along "downward-leftward-downward", the Z-shape is a shape after the Z is rotated 90° counterclockwise, and it is also a bent shape formed by three segments.

At the same time, the first-pole conductive assembly 100 and the second-pole conductive assembly 200 cross each other. Specifically, as shown in FIG. 4 and FIG. 5, in this embodiment, because the bending structures of the first conductive sheet 13 and the second conductive sheet 25 and the two give a way to each other, the first-pole conductive assembly 100 and the second-pole conductive assembly 200 cross, the first-pole conductive assembly 100 and the second-pole conductive assembly 200 are bent laterally, and then cross each other, and finally output wires through the first outlet wire terminal 16 and the second outlet wire terminal 26 respectively, so that the first contact mechanism 15 and the second contact mechanism 23 are laterally arranged in the case 300 in parallel, and are substantially disposed in the span R between the first outlet wire terminal 16 and the second outlet wire terminal 26, therefore, the two contact mechanisms 15, 23 and the operating mechanism 9 are arranged laterally in the space between the first inlet terminal seat 11 and the second inlet terminal seat 21, thereby reducing the overall volume of the circuit breaker. It should be noted that the above-mentioned "span R between the first outlet wire terminal 16 and the second outlet wire terminal 26" should be understood as the span between the connection point between the first outlet wire terminal 16 and the first contact mechanism 15 and the connection point between the second outlet wire terminal 26 and the second conductive sheet 25 in the lateral direction X, that is, the span of the first connecting portion 161 and the second connecting portion 261 in the lateral direction X. The first outlet wire terminal 16 and the second outlet wire terminal 26 can be bent or extended so that the first outlet terminal seat 162 and the second outlet terminal seat 262 are exposed to the case 300 at a suitable interval or length, so as to adapt to the working environment of the distribution box.

In this embodiment, the wiring of the first-pole conductive assembly 100 and the wiring of the second-pole conductive assembly 200 are in a bent shape and have three segments, and are crossed each other, the extension direction of each segment is straight, which is convenient for the installation of the two, at the same time, the first-pole conductive assembly 100 and the second-pole conductive assembly 200 can also be matched with the roughly rectangular parallelepiped shape of the case 300, so as to make the most of the internal space of the case 300. In addition, in this embodiment, the first conductive sheet 13, the first connecting member 14, the second connecting member 24, and the second conductive sheet 25 are used as the conductive connection structure to cooperate to form the bent structures each with three segments of the first-pole conductive assembly 100 and the second-pole conductive assembly 200. In other embodiments, the specific form of the conductive connection structure may not be limited, as long as the wiring layout between the contact mechanisms and the inlet and outlet wire terminals can be satisfied.

Figure 3:
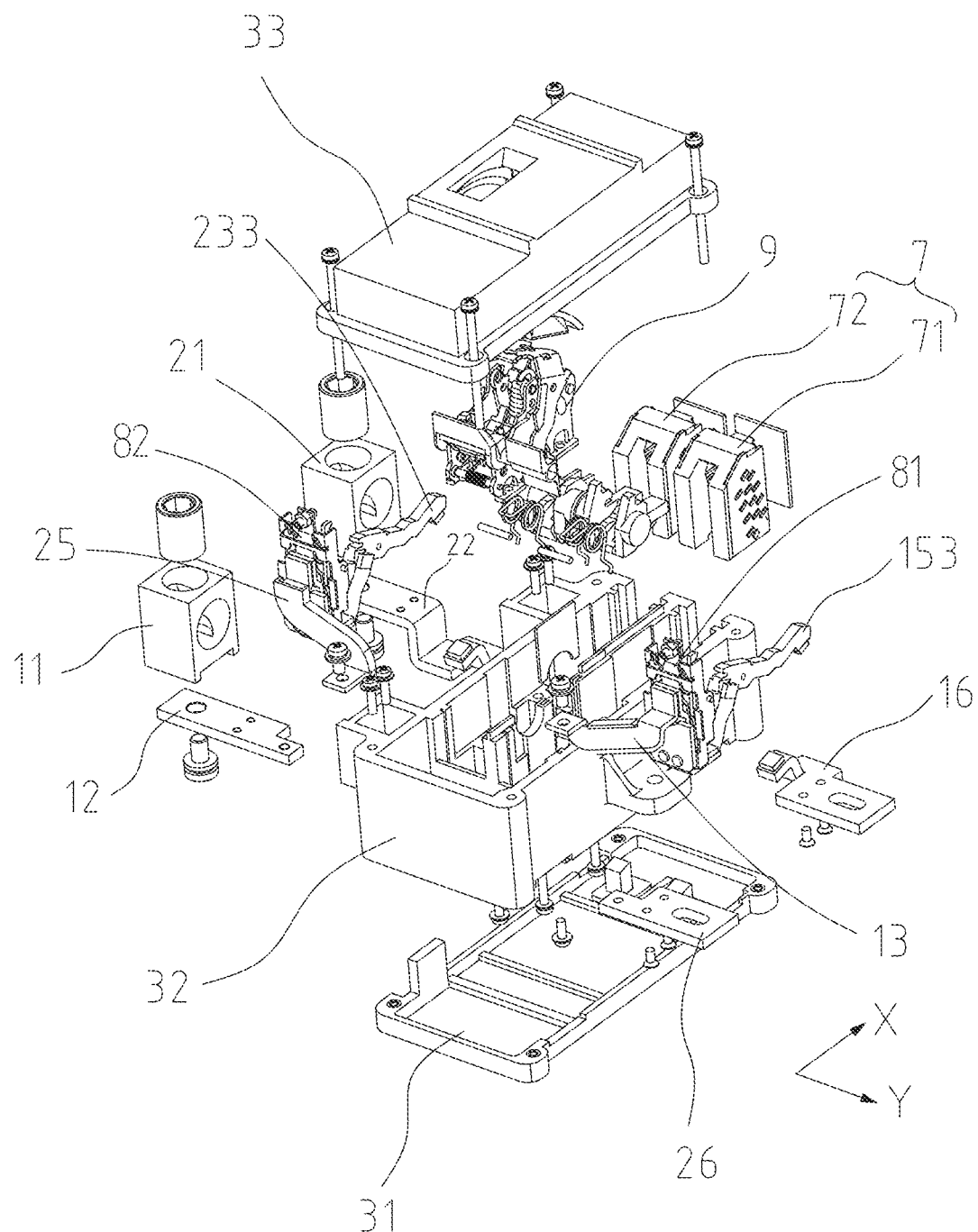
FIG. 3 is an exploded view of the structure of the double-pole circuit breaker in an exemplary embodiment of the present disclosure.

As shown in FIG. 5, the first movable contact 151 has a first moving trace S1 relative to the first stationary contact 152, and the second movable contact 231 has a second moving trace S2 relative to the second stationary contact 232 to realize the first-pole conductive assembly 100 and the second-pole conductive assembly 200 are turned off and on. As shown in FIGS. 2 and 3, the operating mechanism 9 is mounted on the first contact mechanism 15 or the second contact mechanism 23 along the lateral direction X for manipulating the movement of the first movable contact 151 or the second movable contact 231, where, the first swing arm 153 and the second swing arm 233 can be connected by a rotating shaft, when the operating mechanism 9 is manipulated, the first swing arm 153 and the second swing arm 233 can move synchronously, so that the first movable contact 151 and the second movable contact 231 can move synchronously. The extension directions of the first outlet terminal seat 162 and the second outlet terminal seat 262 are perpendicular to the movement planes where the first moving trace S1 and the second moving trace S2 are located respectively, so that the operating mechanism 9 can swing laterally to facilitate operation.

In some embodiments, as shown in FIG. 6, the first inlet terminal seat 11 and the second inlet terminal seat 21 are arranged at the upper side of the case 300, and the first outlet terminal seat 162 and the second outlet terminal seat 262 are arranged at the lower side of the case 300. That is, the inlet wire terminals of the circuit breaker are provided at the upper side and the outlet wire terminals of the circuit breaker are provided at the lower side, forming a layout with incoming wire at a single side and outcoming wire at a single side, so as to make the wiring arrangement of the external wiring of the circuit breaker is more concise. Moreover, in some embodiments, the connecting line from the first inlet terminal seat 11 to the second outlet terminal seat 262 is parallel to the connecting line from the second inlet terminal seat 21 to the first outlet terminal seat 162. It can be understood that the orthographic projection of the central axis of the first inlet terminal seat 11 along the longitudinal direction Y on the bottom wall of the case 300 is connected with the orthographic projection of the central axis of the second outlet terminal seat 262 along the longitudinal direction Y on the bottom wall of the case 300 to form a first connecting line, and the orthographic projection of the central axis of the second inlet terminal seat 21 along the longitudinal direction Y on the bottom wall of the case 300 is connected with the orthographic projection of the central axis of the first outlet terminal seat 162 along the longitudinal direction Y on the bottom wall of the case 300 to form a second connecting line, then the first connecting line and the second connecting line are approximately parallel, that is to say, the extension direction of the first inlet terminal seat 11 and the second outlet terminal seat 262 is substantially parallel to the extension direction of the second inlet terminal seat 21 and the first outlet terminal seat 162, so that wiring is more convenient.

As shown in FIG. 3, the circuit breaker also includes arc extinguishing chambers 7 and over-current releases 8 for arc extinguishing and short circuit protection respectively. There are two arc extinguishing chambers, namely the first arc extinguishing chamber 71 and the second arc extinguishing chamber 72, as shown in FIGS. 2-3, two arc extinguishing chambers 7 are arranged side by side along the longitudinal direction Y inside the fourth side surface 324 of the side wall 32, and the openings of the two arc extinguishing chambers 7 respectively correspond to and face the first contact mechanism 15 and the second contact mechanism 23, which makes the first movable contact 151 and the second movable contact 231 move in the two arc extinguishing chambers 7 respectively, so that the two arc extinguishing chambers 7 respectively accommodate the first moving trace S1 and the second moving trace S2, therefore, the arc extinguishing chambers 7 can extinguish the arc that may be generated. The exhaust direction of the arc extinguishing chambers 7 points to the right side of the case 300, that is, the arc extinguishing chambers 7 exhaust in the direction away from the first contact mechanism 15 and the second contact mechanism 23 along the lateral direction X. Two over-current releases 8 are respectively installed on the first conductive sheet 13 and the second conductive sheet 25, as shown in FIG. 3, a first over-current release 81 is installed on the first conductive sheet 13, and a second over-current release 82 is installed on the second conductive sheet 25, the over-current release 8 prompts the operating mechanism 9 to quickly trip and open the circuit through thermal deformation or magnetic field changes generated by the overload circuit and short-circuit current. Since each arc extinguishing chamber 7 is arranged laterally (that is, the opening of the arc extinguishing chamber 7 faces the contact mechanism), and the inlet and outlet wire terminals are arranged longitudinally, even when the circuit breaker is short-circuited, the arc generated in the arc extinguishing chamber 7 will be ejected along the lateral direction X, the inlet and outlet wire terminals will not be ablated.

Figure 7:
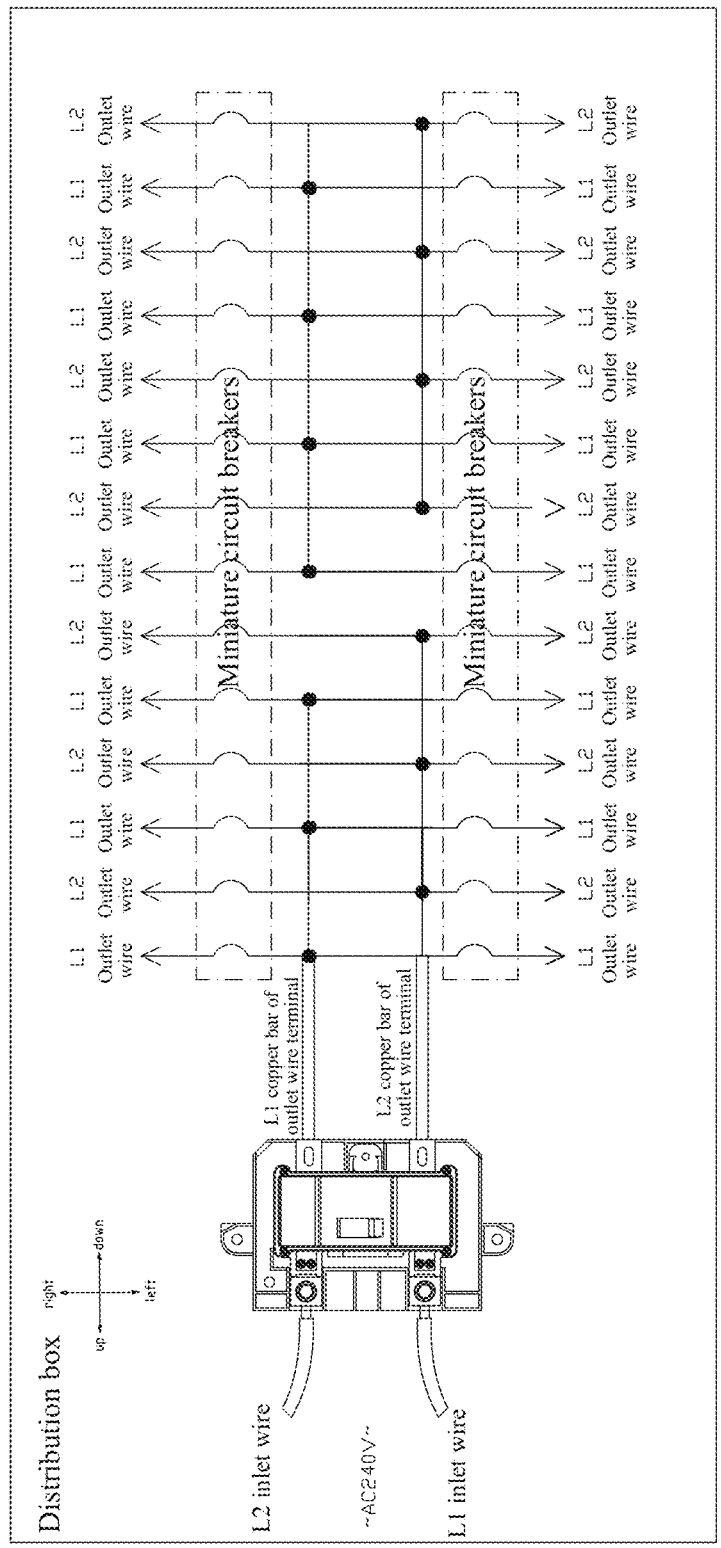
FIG. 7 is a schematic diagram showing a working scene of the double-pole circuit breaker applied in a distribution box in an exemplary embodiment of the present disclosure.
Figure 8:
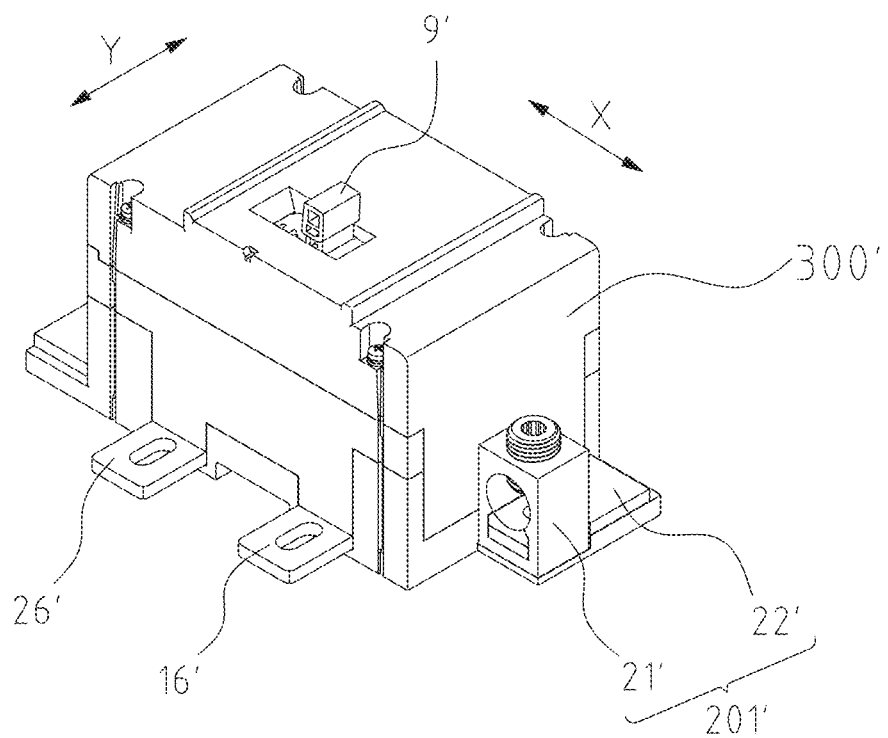
FIG. 8 is a perspective schematic view of a double-pole circuit breaker in another exemplary embodiment of the present disclosure.
Figure 9:
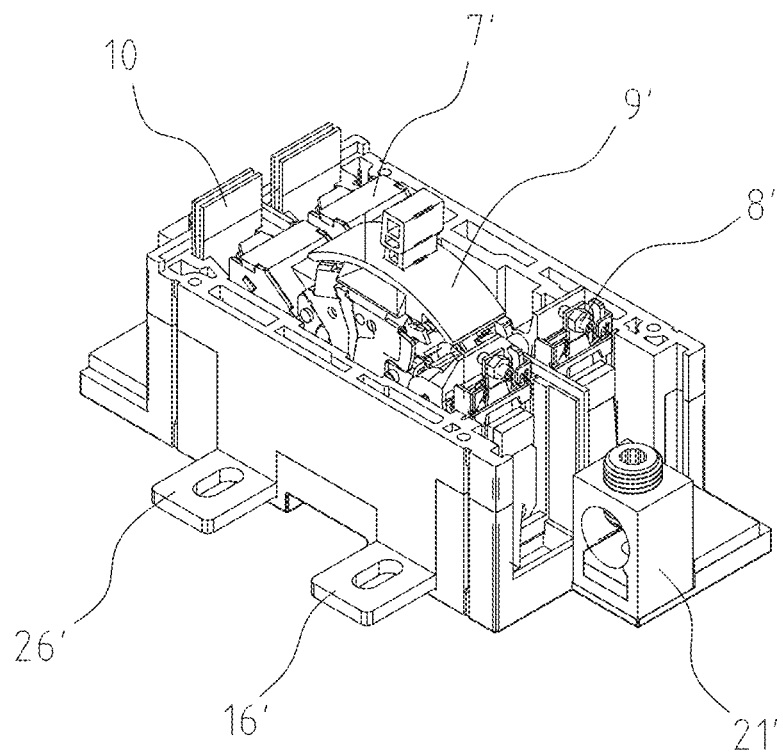
FIG. 9 is a perspective schematic view of a double-pole circuit breaker without a cover in another exemplary embodiment of the present disclosure.
Figure 10:
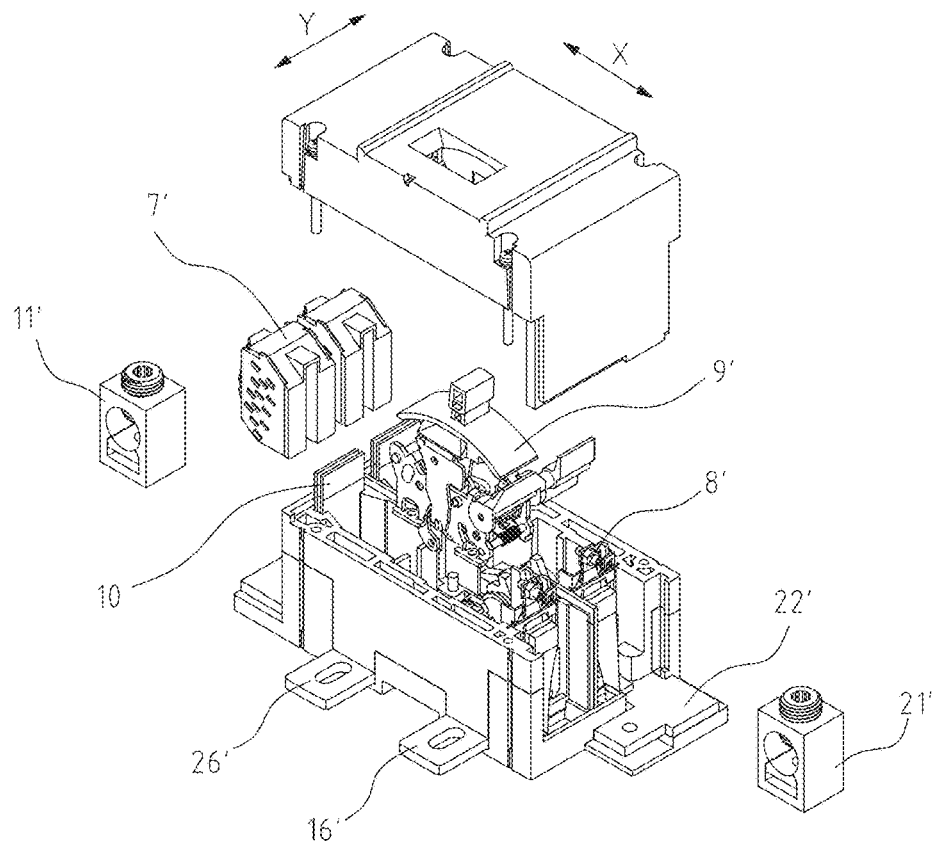
FIG. 10 is an exploded view of the structure of a double-pole circuit breaker in another exemplary embodiment of the present disclosure.

In the double-pole circuit breaker in the above embodiments, the first-pole conductive assembly 100 and the second-pole conductive assembly 200 are bent laterally and are configured to be crossed each other, which makes full use of the space in the lateral direction X between the first inlet terminal seat 11 and the second inlet terminal seat 21 to arrange the contact mechanisms 15, 23 and the operating mechanism 9, so that the volume of the circuit breaker is effectively reduced, and at the same time, the wiring of the inlet and outlet wire terminals of the circuit breaker is also very convenient and simple. FIG. 7 shows a schematic diagram of a double-pole circuit breaker applied in a distribution box, in the figure, L1 represents the wiring of the first-pole conductive assembly 100, and L2 represents the wiring of the second-pole conductive assembly 200. After the wires are respectively inlet from the inlet wire terminals of the double-pole circuit breaker, the wires are crossed each other in the circuit breaker and then are outlet in parallel from the outlet wire terminals, so that the outlet wire terminals can be easily connected to other miniature circuit breakers in the distribution box. At the same time, on the basis of reduced volume, there is enough space inside the double-pole circuit breaker to place the arc extinguishing chambers 7 and the over-current releases 8 to ensure that the circuit breaker has complete circuit breaking and arc extinguishing functions, and the safety performance of the circuit is guaranteed.

Figure 11:
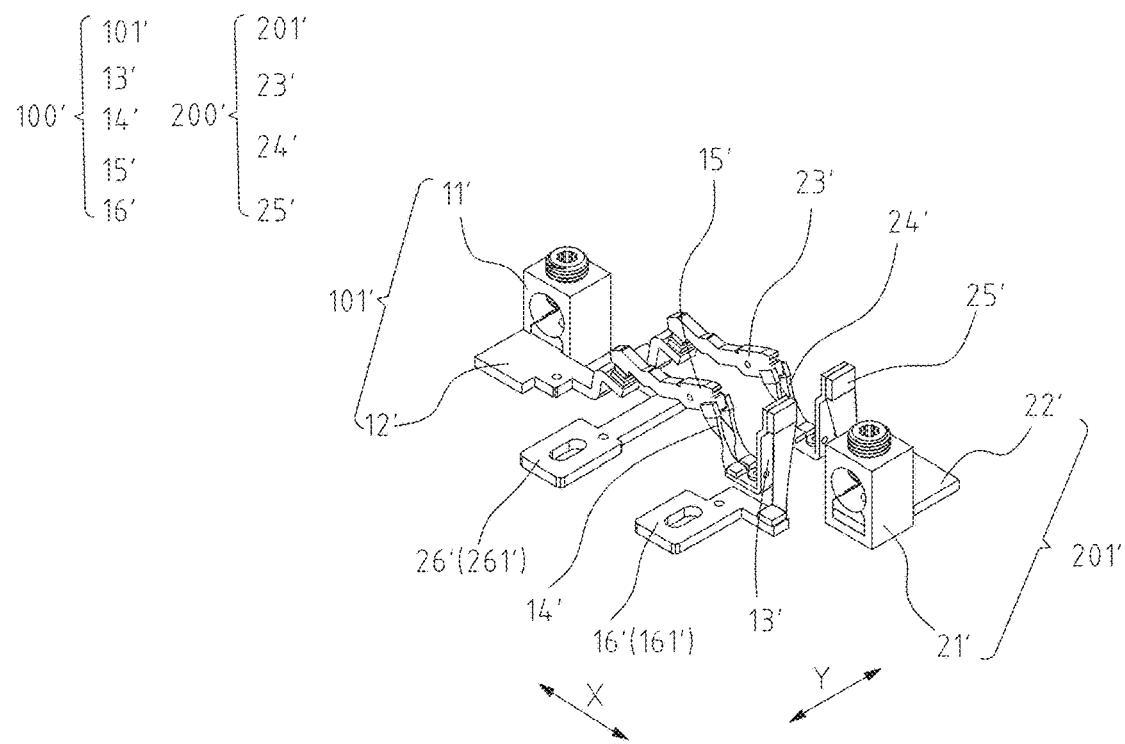
FIG. 11 is a schematic diagram of a first-pole conductive assembly and a second-pole conductive assembly in another exemplary embodiment of the present disclosure.
Figure 12:
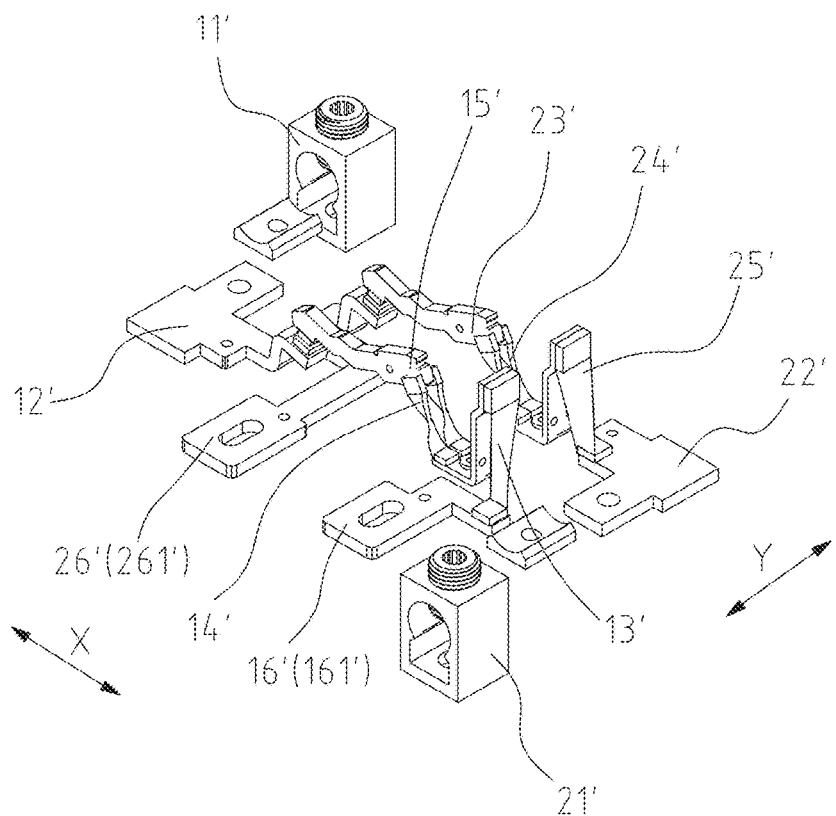
FIG. 12 is an exploded view of a first-pole conductive assembly and a second-pole conductive assembly in another exemplary embodiment of the present disclosure.
Figure 13:
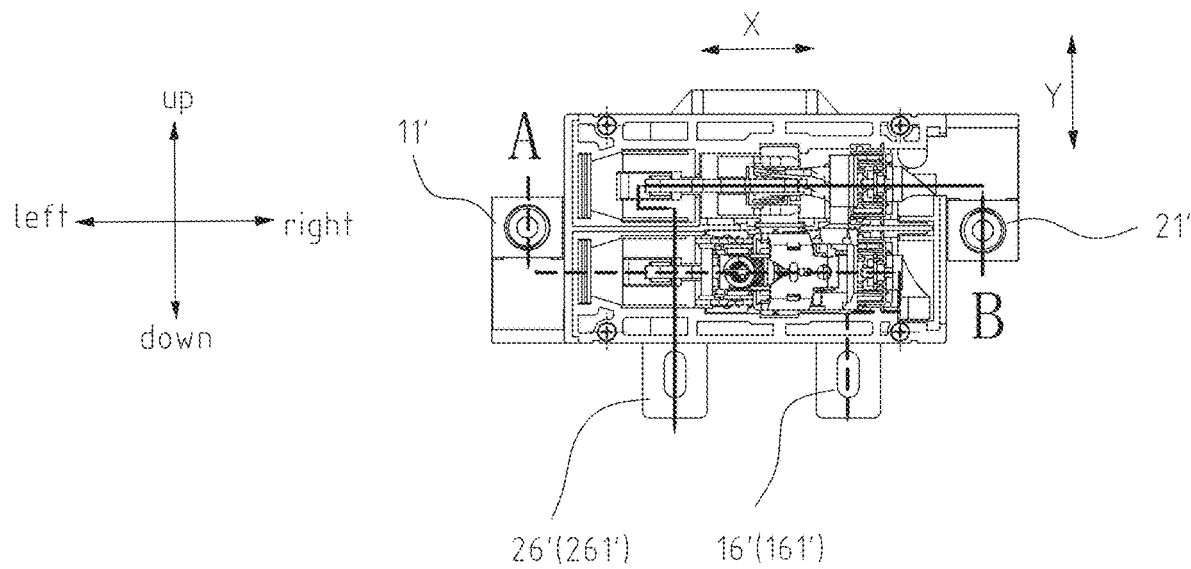
FIG. 13 is a schematic diagram showing the current flow of the double-pole circuit breaker in another exemplary embodiment of the present disclosure (including A-phase power and B-phase power).

In other embodiments of the present disclosure, another double-pole circuit breaker is provided. The double-pole circuit breaker is used in a distribution box, and its structure is basically the same as that of the double-pole circuit breaker in the above embodiments, but the arrangement of the inlet wire terminals is different. Specifically, refer to FIGS. 8-13, The double-pole circuit breaker includes a case 300' and a first-pole conductive assembly 100' and a second-pole conductive assembly 200' installed in the case 300', where, the first-pole conductive assembly 100' includes a first inlet wire terminal 101' (the first inlet wire terminal 101' includes a first inlet terminal seat 11' and a first copper bar 12'), a first contact mechanism 15', a first connecting member 14', a first conductive sheet 13' and a first outlet wire terminal 16' that are connected in sequence. The first outlet wire terminal 16' includes a first outlet terminal seat 161' which is in a shape of sheet and is configured to extend along the longitudinal direction Y. Where, the first inlet wire terminal 101', the first contact mechanism 15', and the first connecting member 14' are arranged in sequence in the lateral direction X, the first outlet wire terminal 16' is arranged along the longitudinal direction Y. As shown in FIG. 12, the first conductive sheet 13' is a bent sheet body, which connects the first connecting member 14', the first contact mechanism 15' extending in the lateral direction X, and the first outlet wire terminal 16' extending in the longitudinal direction Y through its bent structure. As shown in FIG. 11, the second-pole conductive assembly 200' includes a second inlet wire terminal 201' (the second inlet wire terminal 201' includes a second inlet terminal seat 21' and a second copper bar 22'), a second conductive sheet 25', a second connecting member 24', a second contact mechanism 23', and a second outlet wire terminal 26' that are connected in sequence. The second outlet wire terminal 26' includes a second outlet terminal seat 261' which is in a shape of sheet and is configured to extend along the longitudinal direction Y. Where, the second inlet wire terminal 201', the second conductive sheet 25', the second connecting member 24' and the second contact mechanism 23' are arranged in sequence in the lateral direction X, the second outlet wire terminal 26' is arranged along the longitudinal direction Y. As shown in FIG. 13, in this embodiment, the first-pole conductive assembly 100' and the second-pole conductive assembly 200' are also firstly bent laterally, and then are crossed each other, and output wires through the first outlet wire terminal 16' and the second outlet wire terminal 26' respectively, so that the first contact mechanism 15' and the second contact mechanism 23' are transversely arranged in the case 300 in parallel, and are substantially disposed in the span between the first outlet wire terminal 16' and the second outlet wire terminal 26', therefore, the two contact mechanisms 15', 23' and the operating mechanism 9' are arranged laterally by using the space between the first inlet terminal seat 11' and the second inlet terminal seat 21', thereby reducing the overall volume of the circuit breaker. At the same time, the extension directions of the first outlet terminal seat 161' and the second outlet terminal seat 261' are perpendicular to the movement planes where the moving traces of the first contact mechanism 15' and the second contact mechanism 23' are located respectively, so that the operating mechanism 9' can swing in the lateral direction X to facilitate operation.

The main difference between the double-pole circuit breaker in this embodiment and the double-pole circuit breaker in the embodiments described above is: in this embodiment, the first inlet wire terminal 101' and the second inlet wire terminal 201' are arranged on both sides of the case 300' in the lateral direction X, therefore, from a top view, as shown in FIG. 13, the wiring of the first conductive assembly 100' runs from the first inlet wire terminal 101' to the first outlet wire terminal 16', the wiring is arranged in an inverted L-shape extending along "rightward-downward", the inverted L-shape is a bent shape formed by two segments; the wiring of the second conductive assembly 200' runs from the second inlet wire terminal 201' to the second outlet wire terminal 26', the wiring is arranged in an L-shape extending along "leftward-downward", the L-shape is a bent shape formed by two segments, that is, the L-shape is a shape after the L is rotate 90° counterclockwise. The above-mentioned arrangement of the wiring of the first conductive assembly 100' and the wiring of the second conductive assemble 200' is not only convenient for installation, but also can be matched with the roughly rectangular parallelepiped shape of the case 300', thus the internal space of the case 300' is fully utilized, at the same time, this arrangement makes the volume of the double-pole circuit breaker further reduced in the longitudinal direction Y, and the distance between the inlet and out wire terminals is lager, which improves the phase-to-phase insulation effect of the double-pole circuit breaker. Moreover, it should be noted that although the first inlet wire terminal 101' and the second inlet wire terminal 201' are provided on the left and right sides of the case 300', the first inlet terminal seat 11' and the second inlet terminal seat 21' can still be arranged along the longitudinal direction Y respectively through bent structures. Therefore, the wires respectively inlet the two inlet wire terminals 101', 201' parallelly, and outlet the two outlet wire terminals 16', 26' parallelly (as shown in FIGS. 13-14), so as to make the wiring arrangement of the external wiring of the double-pole circuit breaker is more concise.

The same as the above embodiments, the circuit breaker is also provided with components such as over-current release(s) 8', arc extinguishing chamber(s) 7' and an operating mechanism 9', etc., and have the same technical effect as in the above-mentioned embodiments. It is worth noting that, because the first inlet wire terminal 101' is arranged at the side of the case 300' that corresponds to the arc extinguishing chamber 7' in the lateral direction X, and is in the direction of jetting of the arc extinguishing chamber 7', in the embodiment, an arc shield 10 is also provided between the arc extinguishing chamber 7' and the first inlet wire terminal 101' to prevent the arc from overflowing and ablating the terminal.

Figure 14:
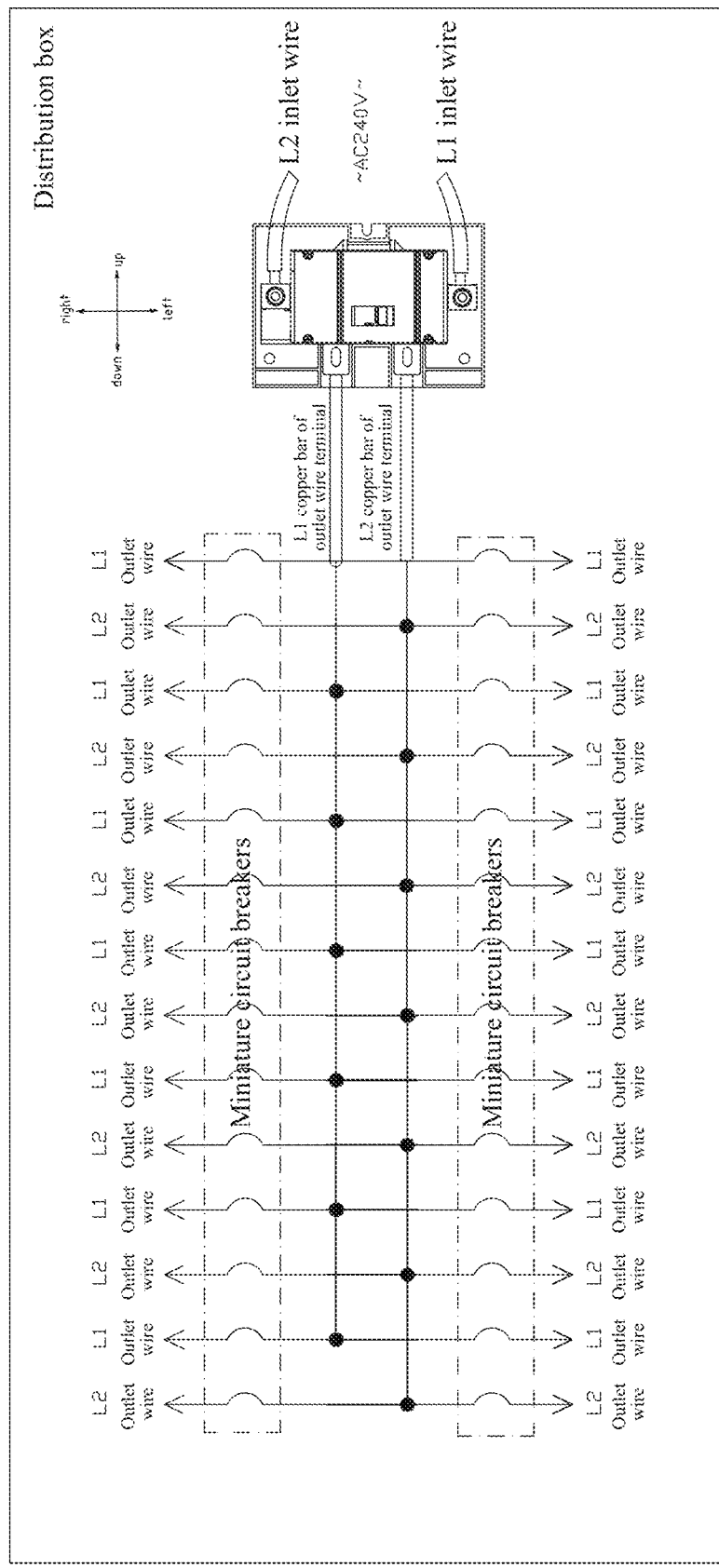
FIG. 14 is a schematic diagram showing a working scene of the double-pole circuit breaker applied in a distribution box in another exemplary embodiment of the present disclosure.

FIG. 14 is a schematic diagram showing the double-pole circuit breaker of this embodiment is applied in a distribution box. After the wires are respectively inlet from the opposite sides of the case 300 of the double-pole circuit breaker in the lateral direction X, the wires are crossed each other in the middle of the circuit breaker and then are outlet in parallel from the lower end of the circuit breaker, so that the outlet wire terminals can be easily connected to other miniature circuit breakers in the distribution box.

The above-mentioned embodiments of the present disclosure have the following beneficial effects: the first-pole conductive assembly and the second-pole conductive assembly of the double-pole circuit breaker provided by the present disclosure are bent laterally, crossed each other and the wires are outlet in parallel, so that the circuit breaker has a small overall volume, convenient wiring, simple wiring, good phase insulation, and complete circuit breaking and arc extinguishing functions.

Figure 15:
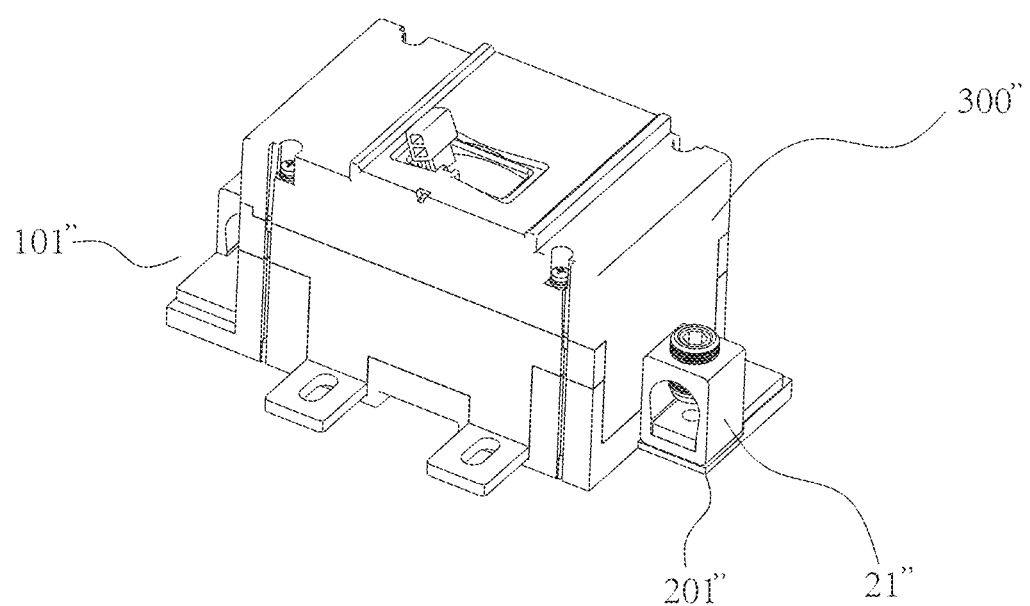
FIG. 15 is a perspective schematic view of a double-pole circuit breaker in an exemplary embodiment of the present disclosure.
Figure 16:
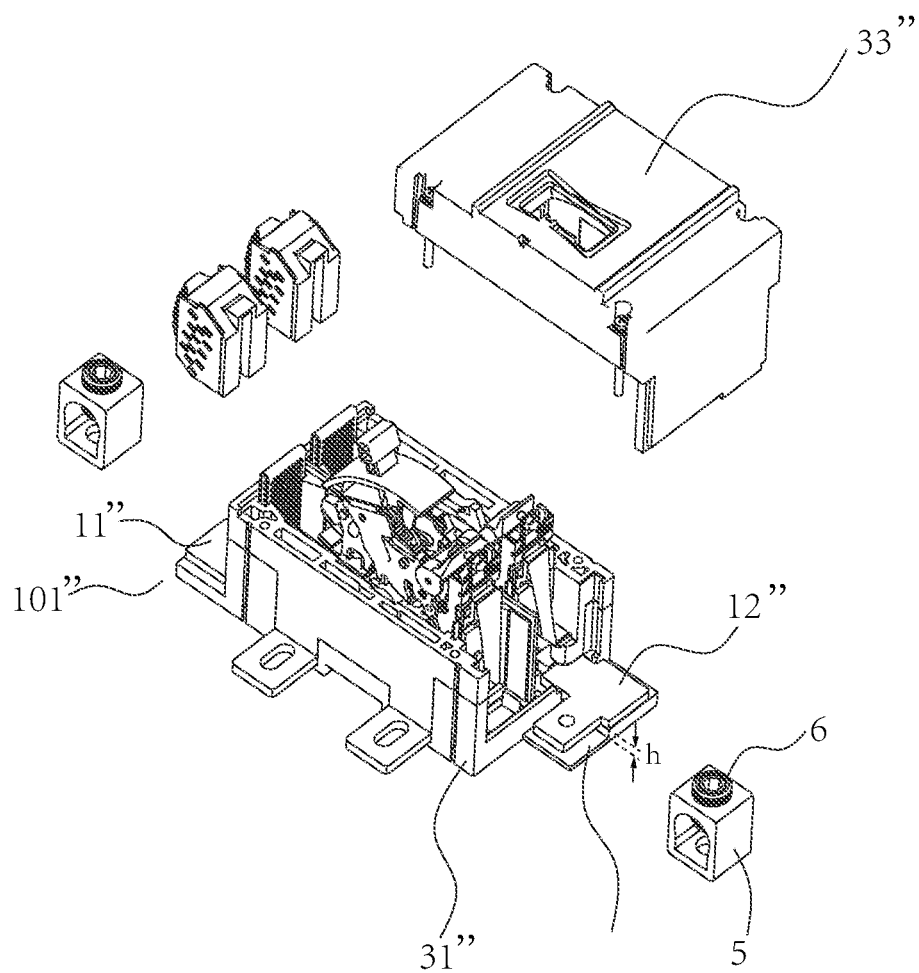
FIG. 16 is an exploded view of the structure of the double-pole circuit breaker in an exemplary embodiment of the present disclosure.
Figure 17:
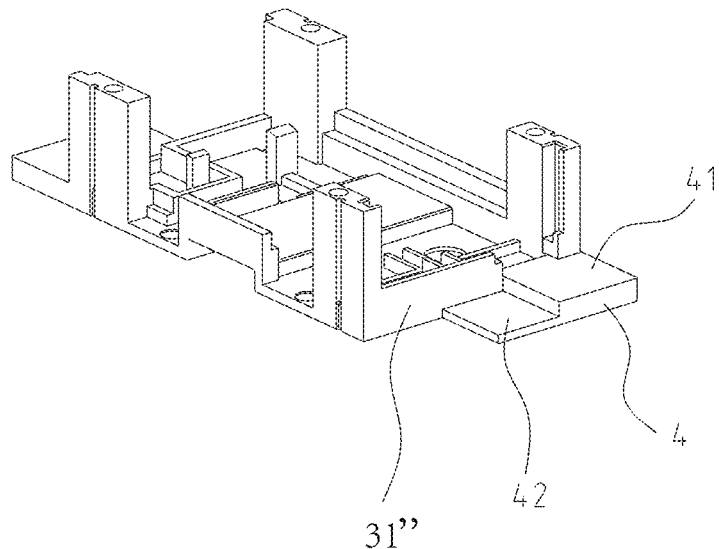
FIG. 17 is a schematic diagram of a base in an exemplary embodiment of the present disclosure.

On the basis of the circuit breaker of all the above embodiments, referring to FIGS. 15-16, the first inlet wire terminal 101" and the second inlet wire terminal 201" (the first inlet wire terminal 101" and the second inlet wire terminal 201" are hereinafter referred to as wiring terminal respectively) of the present disclosure each further include a bracket 4, a nut frame 5 and a screw 6, the screw 6 is screwed on the nut frame 5 and can be rotated to extend into the nut frame 5 to compress the wires. It is defined that one end of the nut frame 5 to which the screw 6 is screwed is the upper end, and the other end away from it is the lower end, the screw 6 is screwed to the upper end of the nut frame 5, and the lower end of the nut frame 5 is supported on the bracket 4. Referring to FIG. 17, the bracket 4 can be fixedly connected to the base 31" by means of screw locking, molding, bonding, etc. The bracket 4 is substantially in a stepped structure, and includes a first step surface 41 and a second step surface 42 with a level difference. The first step surface 41 is used to support the first copper bar 11" or the second copper bar 12", and the second step surface 42 is used to support the nut frame 5. In other embodiments, the first step surface 41 may not be provided, so that the copper bars 11", 12" are only fixedly assembled inside the case 300". However, in this embodiment of the present disclosure, the first step surface 41 is provided to support the copper bars 11", 12", which further strengthens the support for the copper bars 11", 12", and can enhance the stability of the structure. The bracket 4 is integrally formed with the base 31" to be fixedly connected with the base 31", which makes the manufacturing easier, and the bracket 4 is formed on the base 31", so as to be an extended insulating protective baffle, which can prevent the shortcomings of insufficient insulation performance due to the copper bars 11" and 12" being too close to the bottom of the circuit breaker and closer to the distribution box, and the creepage distance is improved by the arrangement of the bracket 4.

Figure 18:
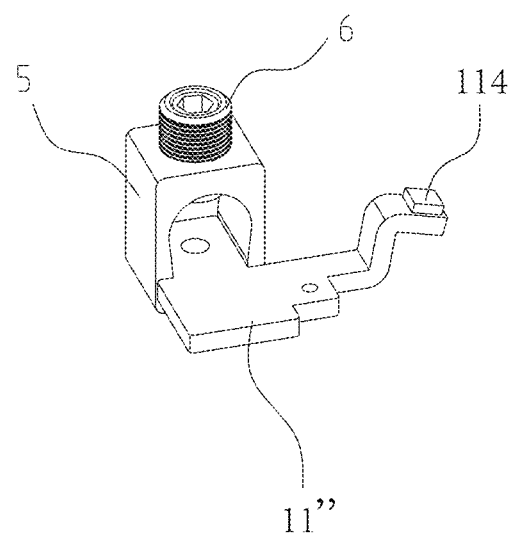
FIG. 18 is a perspective schematic view of a copper bar, a nut frame and a screw assembled together in an exemplary embodiment of the present disclosure.
Figure 19:
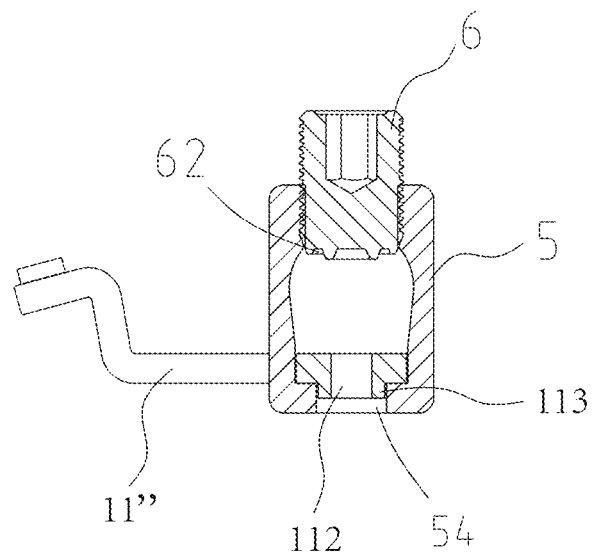
FIG. 19 is a cross-sectional view of the copper bar, the nut frame and the screw assembled together in an exemplary embodiment of the present disclosure.
Figure 20:
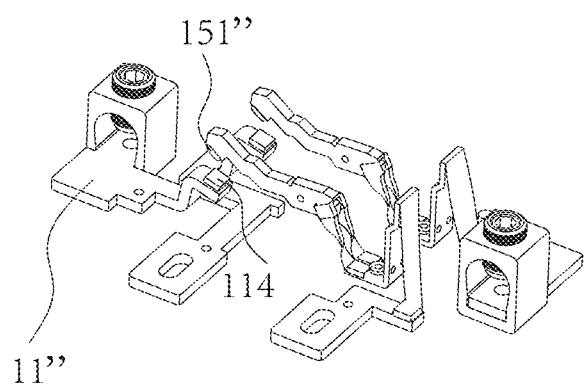
FIG. 20 is a schematic diagram showing a copper bar is cooperated with a movable contact by being in contact therewith.
Figure 21:
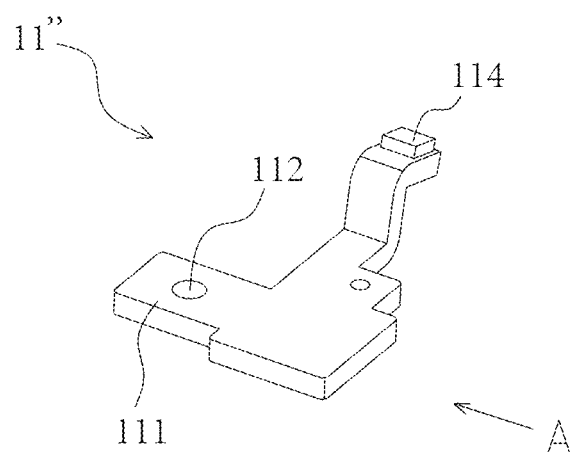
FIG. 21 is a perspective schematic view of the copper bar in an exemplary embodiment of the present disclosure.
Figure 22:
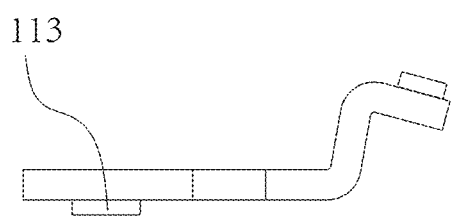
FIG. 22 is a view from the direction A in FIG. 21.
Figure 23:
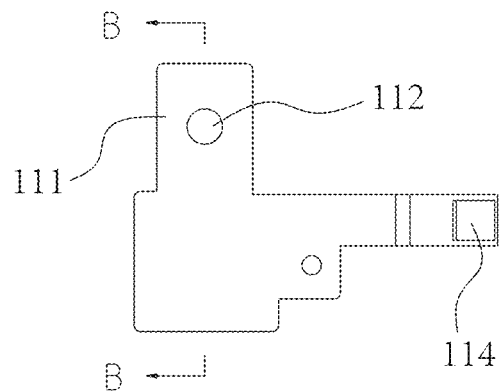
FIG. 23 is a top view of the copper bar in an exemplary embodiment of the present disclosure.
Figure 24:
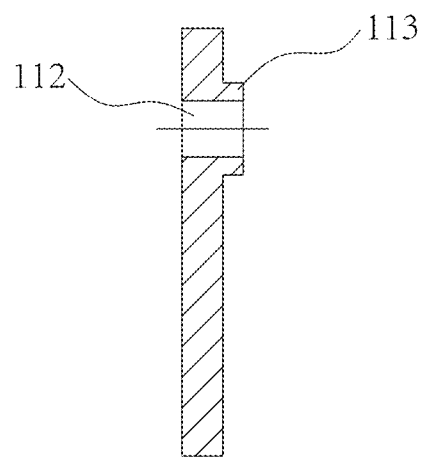
FIG. 24 is a cross-sectional view at B-B in FIG. 23.

Refer to FIGS. 18-19, and in conjunction with FIGS. 20-24, the copper bars 11", 12" are part of the contact conductive system of the circuit breaker, taking the first copper bar 11" as an example, the first copper bar 11" substantially has an L-shaped structure, the first stationary contact 114 is provided on the first copper bar 11" to cooperate with the movement of the first movable contact 151" to realize the on/off of the circuit breaker circuit. As shown in FIG. 21, the first copper bar 11" also includes a sheet-shaped connection portion 111 for electrical connection with external wires, specifically, the connection portion 111 is inserted into the nut frame 5, as shown in FIG. 19, the wire used for wiring is pressed against the connection portion 111 by turning the screw 6 to realize the electrical connection between the wire and the first copper bar 11". As shown in FIGS. 19 and 22, the connection portion 111 is provided with a protruding post 113 for mating with the socket 54 of the nut frame 5 so as to substantially limit the nut frame 5. As shown in FIGS. 23 and 24, coincident with the center of the protruding post 113, a through slot 112 is opened on the connection portion 111 (that is, the protruding post 113 can also be regarded as a flanging of the slot 112). As shown in FIG. 19, the slot 112 is configured to directly face the screw 6, that is, the slot 112 is located directly below the screw 6, when the screw 6 is turned to press the wire used for wiring, the wire (especially the multi-stranded copper wire) can be pressed into the slot 112, so that the wire can be twisted firmly, the anti-pull-off force of the wire is increased to ensure the stability of the wiring. The slot 112 is a through hole that coincides with the center of the protruding post 113, which not only saves material, but also makes the processing easier and improves the manufacturability. In other embodiments, the slot 112 can be provided in other positions of the connection portion 111, as long as it can directly face the screw 6, and the slot 112 can also be a blind hole.

Figure 25:
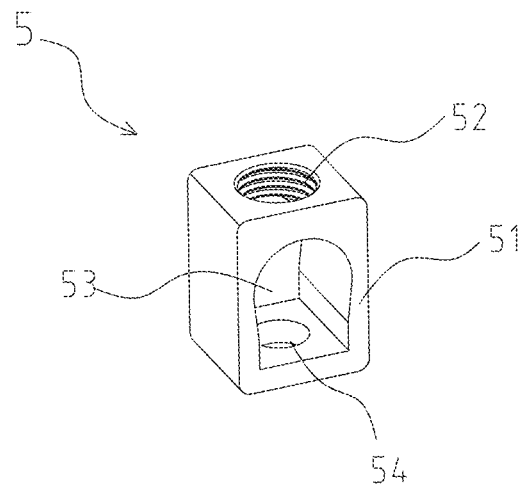
FIG. 25 is a perspective schematic view of the nut frame in an exemplary embodiment of the present disclosure.

Refer to FIGS. 18-19 and in conjunction with FIG. 25, the nut frame 5 is substantially a rectangular parallelepiped with a box-aperture and includes a main body 51, an accommodating groove 53 is defined in the main body 51, and the accommodating groove 53 forms the inner space of the nut frame 5, the shape of the lower part of the accommodating groove 53 is a square for matching the connection portion 111, and is used to match the wiring part 111, and the shape of the upper part is semicircular for accommodating the wire used for wiring. The top of the main body 51 is provided with an internal threaded hole 52 through tapping, and the internal threaded hole 52 is used for screwing the screw 6, a socket 54 is provided at the bottom of the main body 51, and the shape of the socket 54 is configured to substantially match the protruding post 113. When the connection portion 111 is inserted into the nut frame 5, the lower end of the main body 51 is located between the bracket 4 and the first copper bar 11" (or the second copper bar 12"), and the protruding post 113 is inserted into the socket 54, so as to substantially limit the nut frame 5. The nut frame 5 is limited in a way that has a shaking allowance relative to the copper bar 11", 12", therefore, when the wire inserted into the nut frame 5 is a soft multi-stranded copper wire, the nut frame 5 can offset the propelling force of the multi-stranded copper wire through its own shaking, so as to reduce the impact on the copper bar 11", 12". In the embodiment, the value of the fit gap between the protruding post 113 and the socket 54 is in a range of 0.3 mm to 1 mm, so as to ensure that the nut frame 5 has sufficient shaking allowance, and the nut frame 5 is also properly limited. And in the embodiment, the thickness of the bottom plate of the main body 51 is substantially equal to the distance h between the second step surface 42 and the second copper bar 12" (or the first copper bar 11"), as shown in FIG. 16, so that the bottom surface of the second copper bar 12" (or the first copper bar 11") can be in contact with the upper surface of the bottom plate of the main body 51. Therefore, when the screw 6 presses the wire on the second copper bar 12" (or the first copper bar 11"), the nut frame 5 is also compressed and clamped between the second step surface 42 and the second copper bar 12" (or the first copper bar 11") in the height direction, therefore, the nut frame 5 will not shake in its height direction, so as to avoid affecting the stability of the electrical connection between the wire and the copper bar.

Figure 26:
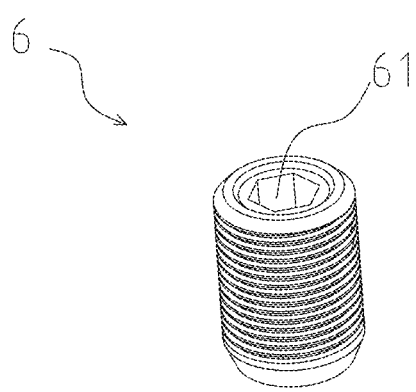
FIG. 26 is a perspective schematic view of the screw in an exemplary embodiment of the present disclosure at a first viewing angle.
Figure 27:
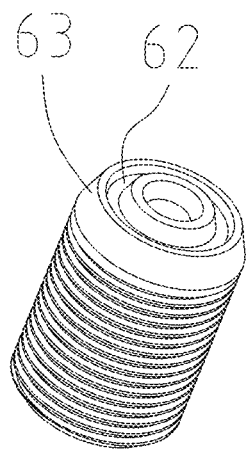
FIG. 27 is a perspective schematic view of the screw in an exemplary embodiment of the present disclosure at a second viewing angle.
Figure 28:
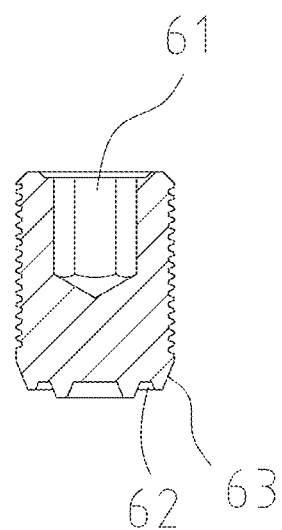
FIG. 28 is a cross-sectional view of the screw in an exemplary embodiment of the present disclosure.

Refer to FIGS. 18-19, and in conjunction with FIGS. 26-28, the screw 6 has a structure of revolution body, and its outer circumference is provided with an external thread, and the screw 6 is screwed into the internal thread hole 52, because the screw 6 is threaded fit with the internal threaded hole 52, when the screw 6 is screwed, the screw 6 can be inserted into the accommodating groove 53 and close to the connection portion 111, so that the wire is pressed against the connection portion 111. As shown in FIG. 26, the end of the screw 6 facing the outer side of the nut frame 5 is provided with a hexagonal groove 61, so that the screw 6 can be rotated by a hexagonal wrench, as shown in FIG. 27, the end portion 63 of the screw 6 facing the connection portion 111 is gradually tapered to increase the pressing force for pressing the wire used for wiring, at the same time, an annular groove 62 is formed on the end surface of the screw 6 facing the connection portion 111. Similar to the slot 112, when the screw 6 is turned to press the wire used for wiring, the wire (especially the multi-stranded copper wire) can be pressed into the annular groove 62, so that the wire can be twisted firmly, the anti-pull-off force of the wire is increased to ensure the stability of the wiring.

This embodiment is different from the related art, in the embodiment, the nut frame 5 and the copper bar are not rigidly fixed together, but the nut frame 5 is supported by the bracket 4, and the protruding post 113 is inserted into the socket 54 to realize the limiting relationship of the nut frame 5 and the copper bar, so that the nut frame 5 has a certain amount of shaking allowance relative to the copper bar. When the wire inserted into the nut frame 5 is a soft multi-stranded copper wire, the nut frame 5 can offset the propelling force of the multi-stranded copper wire through its own shaking, so as to reduce the impact on the copper bar (the copper bar 11" or the second copper bar 12"). After the screw 6 on the nut frame 5 is screwed down to compress the wire end of the wire (the multi-stranded copper wire), because the lower end of the screw 6 and the lower end portion of the nut frame 5 can clamp the copper bar together, the wire, the nut frame 5 and the copper bar can form an integral rigid connection structure without shaking, the structure and function of the assembled inlet wire terminal in the embodiment are similar to the inlet wire terminal in the related art. Therefore, the structure of the inlet wire terminal in this embodiment is not only suitable for the wire whose wire end is hard connections, but also suitable for the wire whose wire end is flexible. In addition, compared with the related art, since the inlet wire terminal of the embodiment also omits the use of a fastening screw located at the lower end of the nut frame for fixing and assembling, the production process is simplified, the production difficulty is reduced and the production cost is also reduced, there is no problem of uneven contact surface between the nut frame and the copper bar or the fastening screws are loose due to thermal expansion and contraction due to the skewed installation of the fastening screws. In addition, because the lower end portion of the nut frame of the embodiment is also supported by the bracket, the insulation performance of the inlet wire terminal is further improved.

The embodiment takes the first inlet wire terminal 101' and the second inlet wire terminal 102' of the wiring terminals of the circuit breaker as examples for description, which can be applied to the double-pole circuit breakers in all the above embodiments. However, the wiring terminal structure provided in this embodiment can also be applied to the outlet wire terminal of a circuit breaker or other electromechanical components, as long as the copper bar (hard material) used to connect the inside of the electromechanical components will affect the internal working environment due to the nut frame shakes when wiring, it can be solved by adopting the improved structure of the wiring terminal described above in the present disclosure, for example, the wiring terminal of the present disclosure can also be applied to: contactors, disconnect switches and low-voltage electrical appliances.

The above-mentioned embodiments of the present disclosure have the following beneficial effects: unlike the related art, in the present disclosure, the nut frame and the copper bar are not rigidly fixed together, instead, the nut frame is supported by the bracket, and the protruding post of the copper bar is inserted into the socket of the nut frame to realize the limit relationship between the nut frame and the copper bar, so that the nut frame has a certain amount of shaking allowance relative to the copper bar, when the wire inserted into the nut frame is a soft multi-stranded copper wire, the nut frame can offset the propelling force of the multi-stranded copper wire through its own shaking, so as to reduce the impact on the copper bar. At the same time, the wiring terminal realizes screw-free assembly, which further simplifies the manufacturing process and reduces the manufacturing difficulty, and further reduces the manufacturing cost.

Although the present disclosure is specifically shown and introduced in conjunction with the preferred embodiments, those skilled in the art should understand that various changes made to this disclosure in form and details without departing from the spirit and scope of the present disclosure as defined by the appended claims fall within the protection scope of the present disclosure.

What is claimed is:

1. A double-pole circuit breaker, comprising a case, a first-pole conductive assembly and a second-pole conductive assembly, wherein the first-pole conductive assembly is disposed and extended in the case and is provided with a first inlet wire terminal and a first outlet wire terminal, the second-pole conductive assembly is disposed and extended in the case and is provided with a second inlet wire terminal and a second outlet wire terminal, the first-pole conductive assembly is provided with a first contact mechanism, the second-pole conductive assembly is provided with a second contact mechanism;

wherein the first-pole conductive assembly and the second-pole conductive assembly are crossed each other, and the first outlet wire terminal comprises a first outlet terminal seat, the second outlet wire terminal comprises a second outlet terminal seat, the first outlet terminal seat and the second outlet terminal seat are arranged side by side and spaced in a lateral direction, and are exposed a first side of the case, the first outlet terminal seat and the second outlet terminal seat are extended in a longitudinal direction, the first contact mechanism and the second contact mechanism are laterally arranged in the case in parallel, and are disposed in a span between the first outlet wire terminal and the second outlet wire terminal.

2. The double-pole circuit breaker according to claim 1, wherein the first contact mechanism and the second contact mechanism respectively have a first moving trace and a second moving trace, an extension direction of the first outlet terminal seat and an extension direction of the second outlet terminal seat are both perpendicular to movement planes where the first moving trace and the second moving trace are located.

3. The double-pole circuit breaker according to claim 2, wherein the first inlet wire terminal comprises a first inlet terminal seat, the second inlet wire terminal comprises a second inlet terminal seat, the first inlet terminal seat and the second inlet terminal seat are arranged side by side and spaced in the lateral direction, and are exposed a second side of the case, the second side is opposite to the first side.

4. The double-pole circuit breaker according to claim 3, wherein a connecting line from the first inlet terminal seat to the second outlet terminal seat is parallel to a connecting line from the second inlet terminal seat to the first outlet terminal seat.

5. The double-pole circuit breaker according to claim 3, wherein the first outlet terminal seat and the second outlet terminal seat are located at a lower side of the case in the longitudinal direction, and the first outlet terminal seat is located at a right side of the second outlet terminal seat in the lateral direction, the first-pole conductive assembly extending from the first inlet wire terminal to the first outlet wire terminal is an inverted Z-shape extending along downwardrightward-downward, the second-pole conductive assembly extending from the second inlet wire terminal to the second outlet wire terminal is a Z-shape extending along downward-leftward-downward.

6. The double-pole circuit breaker according to claim 5, wherein the first inlet wire terminal further comprises a first copper bar, the first-pole conductive assembly further comprises a first conductive sheet and a first connecting member, the first inlet terminal seat, the first copper bar, the first conductive sheet, the first connecting member, the first contact mechanism and the first outlet wire terminal are connected in sequence, the first inlet terminal seat, the first copper bar and the first outlet wire terminal are arranged in sequence in the longitudinal direction, the first contact mechanism and the first connecting member are arranged in the lateral direction;
the first conductive sheet is a bent sheet body, which is configured to connect the first copper bar extending in the longitudinal direction and the first connecting member extending in the lateral direction through a bent structure of the first conductive sheet to make the first-pole conductive assembly extend from the first inlet wire terminal to the first outlet wire terminal along downward-rightward-downward to have the inverted Z-shape;
the second inlet wire terminal further comprises a second copper bar, the second-pole conductive assembly further comprises a second conductive sheet and a second connecting member, the second inlet terminal seat, the second copper bar, the second contact mechanism, the second connecting member, the second conductive sheet, and the second outlet wire terminal are connected in sequence, the second inlet terminal seat, the second copper bar and the second outlet wire terminal are arranged in sequence in the longitudinal direction, the second contact mechanism and the second connecting member are arranged in the lateral direction;
the second conductive sheet is a bent sheet body, which is configured to connect the second connecting member extending in the lateral direction and the second outlet wire terminal extending in the longitudinal direction through a bent structure of the second conductive sheet to make the second-pole conductive assembly extend from the second inlet wire terminal to the second outlet wire terminal along downward-leftward-downward to have the Z-shape.

7. The double-pole circuit breaker according to claim 6, further comprising:
a first over-current release installed on the first conductive sheet; and
a second over-current release installed on the second conductive sheet.

8. The double-pole circuit breaker according to claim 6, further comprising:
a first arc extinguishing chamber configured to accommodate the first moving trace; and
a second arc extinguishing chamber configured to accommodate the second moving trace.

9. The double-pole circuit breaker according to claim 1, wherein the first outlet terminal seat is located at a right side of the second outlet terminal seat in the lateral direction, and the first inlet wire terminal and the second inlet wire terminal are respectively arranged at a left side and a right side of the case in the lateral direction.

10. The double-pole circuit breaker according to claim 9, wherein the first outlet terminal seat and the second outlet terminal seat are located at a lower side of the case in the longitudinal direction, the first-pole conductive assembly extending from the first inlet wire terminal to the first outlet wire terminal is an inverted L-shape extending along rightward-downward, the second-pole conductive assembly extending from the second inlet wire terminal to the second outlet wire terminal is an L-shape extending along leftward-downward.

11. The double-pole circuit breaker according to claim 10, wherein the first inlet wire terminal comprises a first inlet terminal seat, the second inlet wire terminal comprises a second inlet terminal seat, the first inlet terminal seat and the second inlet terminal seat are spaced apart in the longitudinal direction and arranged up and down.

12. The double-pole circuit breaker according to claim 10, wherein the first-pole conductive assembly comprises a first inlet wire terminal, a first contact mechanism, a first connecting member, a first conductive sheet and a first outlet wire terminal that are connected in sequence, the first inlet wire terminal, the first contact mechanism and the first connecting member are arranged in the lateral direction, the first outlet wire terminal arranged in the longitudinal direction, the first conductive sheet is a bent sheet body, which is configured to connect the first connecting member extending in the lateral direction and the first outlet wire terminal extending in the longitudinal direction through a bent structure of the first conductive sheet to make the first-pole conductive assembly extend from the first inlet wire terminal to the first outlet wire terminal along rightward-downward to have the inverted L-shape;
the second-pole conductive assembly comprises a second inlet wire terminal, a second conductive sheet, a second connecting member, a second contact mechanism, and a second outlet wire terminal that are connected in sequence, the second inlet wire terminal, the second conductive sheet, the second connecting member and the second contact mechanism are arranged in the lateral direction, the second outlet wire terminal arranged in the longitudinal direction, so as to make the second-pole conductive assembly extend from the second inlet wire terminal to the second outlet wire terminal along leftward-downward to have the L-shape.

13. The double-pole circuit breaker according to claim 1, further comprising:
an operating mechanism installed laterally on the first contact mechanism or the second contact mechanism and configured to control the closing and opening of the first contact mechanism or the second contact mechanism, so that the first contact mechanism and the second contact mechanism are moved synchronously.

14. The double-pole circuit breaker according to claim 1, further comprising: a nut frame, a screw, a copper bar and a bracket, wherein the screw is screwed on the nut frame and is enable to be rotated to inserted into the nut frame, one end of the nut frame to which the screw is screwed is an upper end, and another end away from the upper end is a lower end; the lower end of the nut frame is supported on the bracket, the nut frame is provided with a socket, the copper bar is provided with a protruding post matching a shape of the socket, the copper bar is inserted into the nut frame, the lower end of the nut frame is located between the bracket and the copper bar, and the protruding post is inserted into the socket, so that the nut frame is limited.

15. The double-pole circuit breaker according to claim 14, wherein the nut frame is limited in a way of having shaking allowance; a value of a fit gap between the protruding post and the socket is in a range of 0.3 mm to 1 mm.

16. The double-pole circuit breaker according to claim 14, wherein a thickness of the lower end of the nut frame is equal to a distance between the bracket and the copper bar.

17. The double-pole circuit breaker according to claim 14, wherein the copper bar is defined with a slot at a position facing the screw column directly; the slot is a through hole, and a center of the slot is coincided with a center of the protruding post.

18. The double-pole circuit breaker according to claim 14, wherein an annular groove is formed on an end surface of the screw facing the copper bar; one end portion of the screw facing the copper bar is in a tapered shape that is gradually contracted.

19. The double-pole circuit breaker according to claim 14, wherein the bracket is in a stepped structure, and comprises a first step surface and a second step surface with a level difference, the copper bar is supported on the first step surface, and a bottom of the nut frame is supported on the second step surface.

20. A distribution box, comprising a double-pole circuit breaker provided at an inlet end of the distribution box, the double-pole circuit breaker comprising: a case, a first-pole conductive assembly and a second-pole conductive assembly, wherein the first-pole conductive assembly is disposed and extended in the case and is provided with a first inlet wire terminal and a first outlet wire terminal, the second-pole conductive assembly is disposed and extended in the case and is provided with a second inlet wire terminal and a second outlet wire terminal, the first-pole conductive assembly is provided with a first contact mechanism, the second-pole conductive assembly is provided with a second contact mechanism; the first-pole conductive assembly and the second-pole conductive assembly are crossed each other, and the first outlet wire terminal comprises a first outlet terminal seat, the second outlet wire terminal comprises a second outlet terminal seat, the first outlet terminal seat and the second outlet terminal seat are arranged side by side and spaced in a lateral direction, and are exposed a first side of the case, the first outlet terminal seat and the second outlet terminal seat are extended in a longitudinal direction, the first contact mechanism and the second contact mechanism are laterally arranged in the case in parallel, and are disposed in a span between the first outlet wire terminal and the second outlet wire terminal.

* * * * *